(12) United States Patent
Higuchi et al.

(10) Patent No.: US 12,348,877 B2
(45) Date of Patent: Jul. 1, 2025

(54) IMAGING DEVICE AND IMAGE PROCESSING DEVICE

(71) Applicant: Socionext Inc., Kanagawa (JP)

(72) Inventors: Tsuyoshi Higuchi, Yokohama (JP); Yuji Umezu, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 173 days.

(21) Appl. No.: 18/106,656

(22) Filed: Feb. 7, 2023

(65) Prior Publication Data

US 2023/0283912 A1    Sep. 7, 2023

(30) Foreign Application Priority Data

Mar. 2, 2022 (JP) ................. 2022-031752

(51) Int. Cl.
| | |
|---|---|
| *H04N 23/745* | (2023.01) |
| *H04N 5/265* | (2006.01) |
| *H04N 23/73* | (2023.01) |
| *H04N 23/76* | (2023.01) |
| *H04N 25/533* | (2023.01) |

(52) U.S. Cl.
CPC .......... *H04N 23/745* (2023.01); *H04N 5/265* (2013.01); *H04N 23/73* (2023.01); *H04N 23/76* (2023.01); *H04N 25/533* (2023.01)

(58) Field of Classification Search
CPC ...... H04N 23/745; H04N 5/265; H04N 23/73; H04N 23/76; H04N 25/533; H04N 25/531; H04N 23/60
See application file for complete search history.

(56) References Cited

U.S. PATENT DOCUMENTS

| | | | |
|---|---|---|---|
| 6,710,818 B1 | 3/2004 | Kasahara et al. | |
| 9,313,427 B2* | 4/2016 | Moore | H04N 25/77 |
| 9,538,091 B2* | 1/2017 | Maeyama | H04N 23/741 |
| 2013/0113959 A1* | 5/2013 | Ho | H04N 23/745 |
| | | | 348/226.1 |
| 2018/0167545 A1 | 6/2018 | Kosaka | |
| 2022/0232157 A1 | 7/2022 | Miyatani | |

FOREIGN PATENT DOCUMENTS

| | | |
|---|---|---|
| JP | 2001-111887 A | 4/2004 |
| JP | 2016-096551 A | 5/2016 |
| JP | 2017-034422 A | 2/2017 |
| JP | 2017-112409 A | 6/2017 |
| JP | 2018-098649 A | 6/2018 |
| WO | 2020/246250 A1 | 12/2020 |
| WO | 2020/255715 A1 | 12/2020 |

\* cited by examiner

*Primary Examiner* — Sinh Tran
*Assistant Examiner* — Angel L Garces-Rivera
(74) *Attorney, Agent, or Firm* — Rimon P.C.

(57) ABSTRACT

An imaging device includes: an imaging element including a plurality of photoelectric conversion elements arranged in a matrix, and configured to be driven in units of a plurality of lines each including a plurality of photoelectric conversion elements arranged in one direction; a memory; and a processor. The processor is configured to execute detecting an occurrence of a flicker, based on image data generated by the imaging element; and increasing a number of times of exposures in one-frame period of the photoelectric conversion elements included in a line in which the flicker is detected by the detecting, compared with a number of times of exposures in the one-frame period of the photoelectric conversion elements included in a line in which a flicker is not detected.

3 Claims, 24 Drawing Sheets

FIG.14

| | F[n] (NORMAL IMAGE) | F[n+1] (ADDITIONAL IMAGE) | F[n]+F[n+1] (SYNTHESIZED IMAGE) | M | DIF | IDEAL α |
|---|---|---|---|---|---|---|
| TRAFFIC SIGNAL | | | | SMALL PIXEL VALUE / GREAT PIXEL VALUE | SMALL PIXEL DIFFERENCE / GREAT PIXEL DIFFERENCE | α=1.0 |
| VEHICLE (MOBILE OBJECT) | | | | SMALL PIXEL VALUE | SMALL PIXEL DIFFERENCE / GREAT PIXEL DIFFERENCE | α=2.0 |
| STATIONARY OBJECT | | | | SMALL PIXEL VALUE | SMALL PIXEL DIFFERENCE | α=2.0 |

FIG.19

| | F[n] (PRE-IMAGE) | F[n+1] (POST-IMAGE) | F[n]+F[n+1] (SYNTHESIZED IMAGE) | M | DIF | IDEAL α |
|---|---|---|---|---|---|---|
| TRAFFIC SIGNAL | | | | SMALL PIXEL VALUE / GREAT PIXEL VALUE | SMALL PIXEL DIFFERENCE / GREAT PIXEL DIFFERENCE | α=1.0 |
| VEHICLE (MOBILE OBJECT) | | | | SMALL PIXEL VALUE | SMALL PIXEL DIFFERENCE / GREAT PIXEL DIFFERENCE | α=1/K |
| STATIONARY OBJECT | | | | SMALL PIXEL VALUE | SMALL PIXEL DIFFERENCE | α=1/K |

FIG.23

| | F[n]<br>(THINNED-OUT<br>IMAGES) | F[n+1]<br>(THINNED-OUT<br>IMAGES) | Fm+Fi | Fm | M | DIF |
|---|---|---|---|---|---|---|
| TRAFFIC SIGNAL | | | | | SMALL PIXEL VALUE / GREAT PIXEL VALUE | SMALL PIXEL DIFFERENCE / GREAT PIXEL DIFFERENCE |
| VEHICLE (MOBILE OBJECT) | | | | | SMALL PIXEL VALUE | SMALL PIXEL DIFFERENCE / GREAT PIXEL DIFFERENCE |
| STATIONARY OBJECT | | | | | SMALL PIXEL VALUE | SMALL PIXEL DIFFERENCE |

IMAGING DEVICE AND IMAGE PROCESSING DEVICE

CROSS-REFERENCE TO RELATED APPLICATIONS

The present application is based upon and claims the benefit of priority under 35 U.S.C. § 119 of Japanese Patent Application No. 2022-031752 filed on Mar. 2, 2022, the entire contents of which are hereby incorporated by reference.

TECHNICAL FIELD

The present disclosure relates to an imaging device and an image processing device.

BACKGROUND ART

In the case where a light source such as a traffic signal is included in an image captured by an imaging device, in some cases, a flicker occurs. In order to suppress a flicker, for example, the exposure time of the imaging device is adjusted, or image data is synthesized from data items obtained by the imaging device for multiple times.

RELATED ART DOCUMENTS

Patent Documents

[Patent Document 1] Japanese Laid-Open Patent Application No. 2016-96551
[Patent Document 2] Japanese Laid-Open Patent Application No. 2017-112409
[Patent Document 3] Japanese Laid-Open Patent Application No. 2001-111887
[Patent Document 4] WO 2020/255715
[Patent Document 5] WO 2020/246250
[Patent Document 6] Japanese Laid-Open Patent Application No. 2018-98649
[Patent Document 7] Japanese Laid-Open Patent Application No. 2017-34422

In the case of executing a process of suppressing a flicker on the entire image based on image data obtained by the imaging device, a blur or the like may occur in the image in an area in which no flicker occurs, that would make the image unnatural.

SUMMARY

According to an aspect in the present disclosure, an imaging device includes: an imaging element including a plurality of photoelectric conversion elements arranged in a matrix, and configured to be driven in units of a plurality of lines each including a plurality of photoelectric conversion elements arranged in one direction; a memory; and a processor. The processor is configured to execute detecting an occurrence of a flicker, based on image data generated by the imaging element; and increasing a number of times of exposures in one-frame period of the photoelectric conversion elements included in a line in which the flicker is detected by the detecting, compared with a number of times of exposures in the one-frame period of the photoelectric conversion elements included in a line in which a flicker is not detected.

BRIEF DESCRIPTION OF DRAWINGS

FIG. 14 is an explanatory diagram illustrating an example of operations of the image synthesis unit in FIG. 13;
FIG. 19 is an explanatory diagram illustrating an example of operations of the image synthesis unit in FIG. 16;
FIG. 23 is an explanatory diagram illustrating an example of operations of the image synthesis unit in FIG. 20.

EMBODIMENTS OF THE INVENTION

In the following, embodiments will be described with reference to the drawings. In the following descriptions, in some cases, image data is simply referred to as an image.

According to the disclosed techniques, by executing a process of suppressing a flicker in an area in which a flicker occurs, an unnatural image in an area in which no flicker occurs can be suppressed.

First Embodiment

Figure 1:
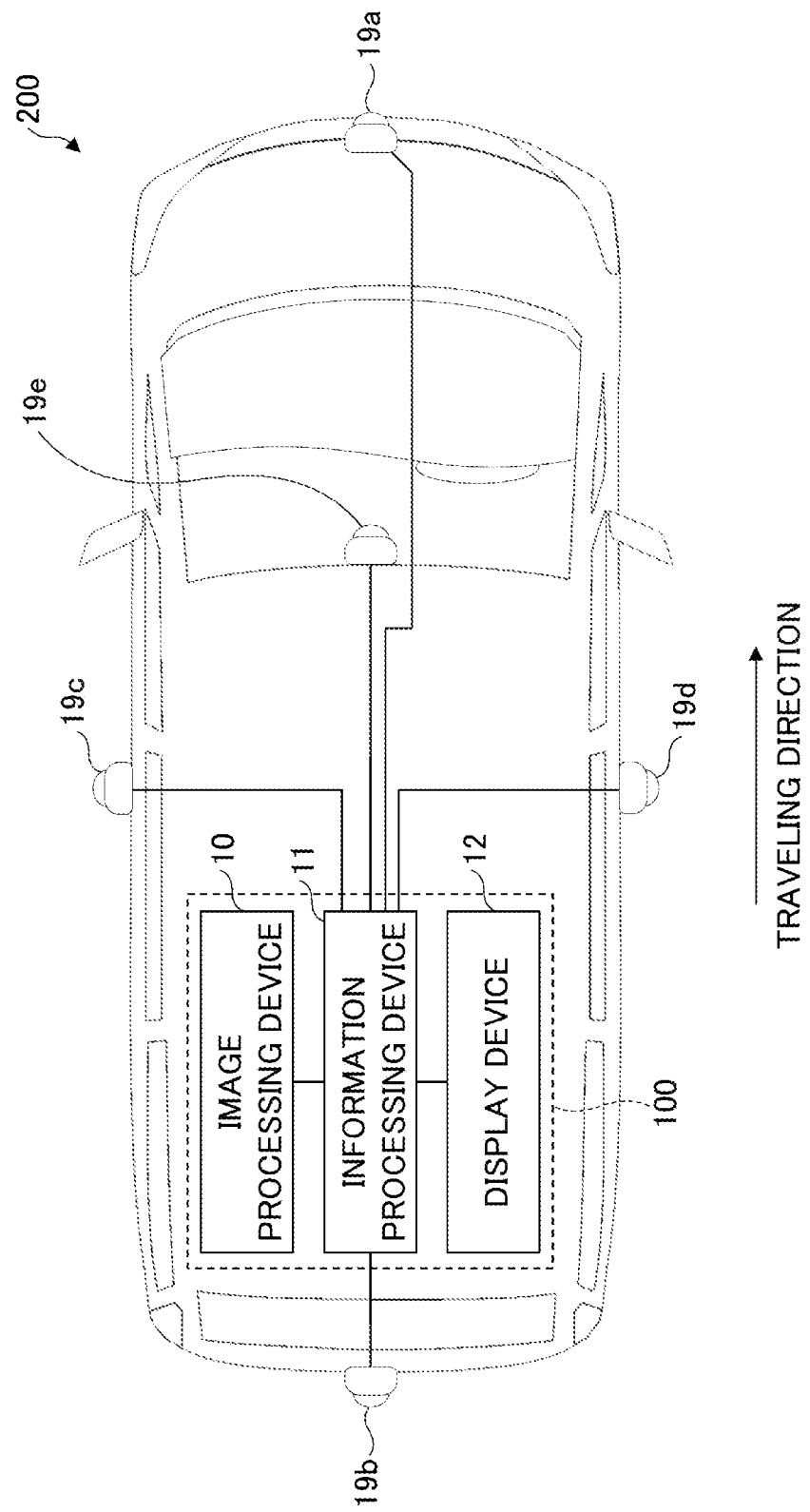
FIG. 1 is a schematic diagram illustrating an example of an image processing system including an image processing device according to a first embodiment.

FIG. 1 illustrates an example of an image processing system that includes an image processing device according to a first embodiment. An image processing system 100 illustrated in FIG. 1 is installed in, for example, a mobile body 200 such as an automobile. Imaging devices 19a, 19b, 19c, 19d, and 19e such as cameras are installed in the front, rear, left, and right of the mobile body 200 with respect to the traveling direction, and in the front of the vehicle interior of the mobile body 200. In the following, in the case where the imaging devices 19a, 19b, 19c, 19d, and 19e are described without distinction, these may also be referred to as the imaging device(s) 19.

Note that the number and installation positions of the imaging devices 19 installed in the mobile body 200 are not limited to those in FIG. 1. For example, one imaging device 19 may be installed only in the front of the mobile body 200, or two imaging devices 19 may be installed only in the front and rear. Alternatively, the imaging device 19 may be installed on the ceiling of the mobile body 200. In addition, the mobile body 200 in which the image processing system 100 is installed is not limited to an automobile, and may be, for example, a conveyor robot operating in a factory or a drone. In addition, the image processing system 100 may be a system that processes images obtained from an imaging device other than the imaging devices installed in the mobile body 200, for example, a monitoring camera, digital still camera, digital camcorder, or the like.

The image processing system 100 includes an image processing device 10, an information processing device 11, and a display device 12. Note that in FIG. 1, the image processing system 100 is superimposed on a schematic view of the mobile body 200 viewed from above, in order to make the description easier to understand. However, in practice, the image processing device 10 and the information processing device 11 are installed in a control board or the like installed in the mobile body 200, and the display device 12 is installed at a position visible to a person in the mobile body 200. Note that the image processing device 10 may be installed in the control board or the like as part of the information processing device 11. The image processing device 10 is connected to each of the imaging devices 19 via signal lines or by radio.

The display device 12 is, for example, a side mirror monitor, a rearview mirror monitor, or a display of a navigation device installed in the mobile body 200. Note that the display device 12 may be a display provided on a dashboard or the like, or a head-up display for projecting images on a projection plate, windshield, or the like.

The information processing device 11 includes a computer such as a processor that executes recognition processing or the like based on image data received via the image processing device 10. For example, the information processing device 11 installed in the mobile body 200 executes recognition processing of image data to detect other mobile bodies, signals, signs, white lines on roads, persons, and the like, so as to determine the situation around the mobile body 200 based on the detection result. Note that the information processing device 11 may include an automatic drive control device that controls movement, stops, right turns, left turns, and the like of the mobile body 200.

In this embodiment, image processing to reduce a flicker that will be described later, is executed by the imaging device 19. Therefore, among the multiple imaging devices 19, an imaging device 19e or imaging device 19a installed at least in the front of the mobile body 200 includes an image processing device that reduces a flicker.

Figure 2:
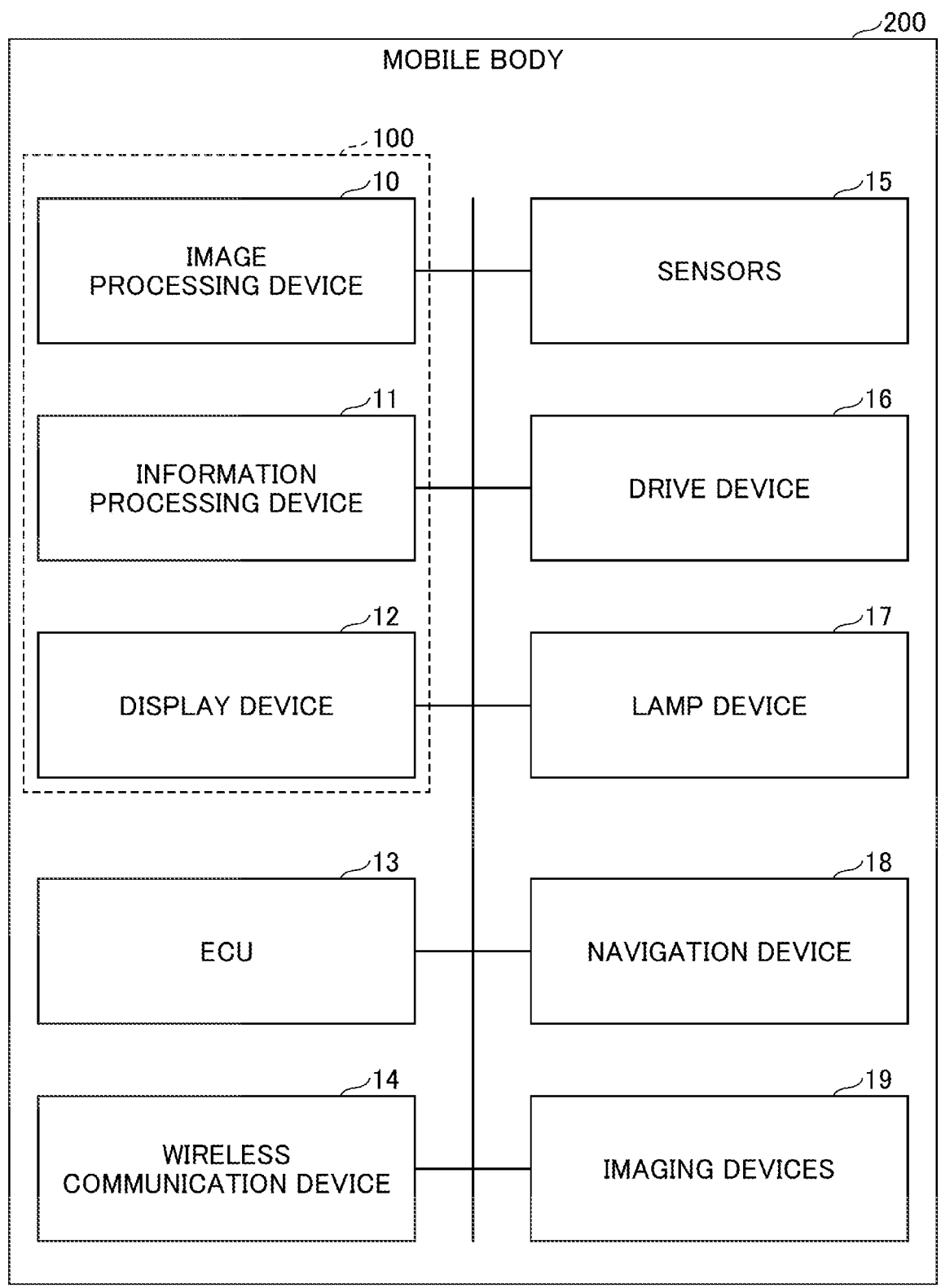
FIG. 2 is a block diagram illustrating an overview of a configuration of various types of devices installed in a mobile body in FIG. 1.

FIG. 2 illustrates an overview of a configuration of various types of devices installed in the mobile body 200 in FIG. 1. The mobile body 200 includes the image processing device 10, the information processing device 11, the display device 12, at least one electronic control unit (ECU) 13, and a wireless communication device 14 that are connected to each other via an internal network. In addition, the mobile body 200 includes sensors 15, a drive device 16, a lamp device 17, a navigation device 18, and the imaging devices 19. For example, the internal network is an in-vehicle network such as CAN (Controller Area Network) or Ethernet (R).

The image processing device 10 corrects image data (frame data) obtained by the imaging devices 19, to generate corrected image data. The image processing device may record the generated corrected image data on an external or internal recording device.

The information processing device 11 may function as a computer that controls the respective units of the mobile body 200. The information processing device 11 controls the entire mobile body 200 by controlling the ECU(s) 13. The information processing device 11 may recognize an object outside the mobile body 200, or may track a recognized object based on images generated by the image processing device 10.

The display device 12 displays images generated by the image processing device 10, corrected images, and the like. The display device 12 may display images in the backward direction of the mobile body 200 in real time while the mobile body 200 is moving backward. In addition, the display device 12 may display an image output from the navigation device 18.

The ECU 13 is provided for each mechanical part including an engine, a transmission, or the like. Each of the ECUs 13 controls the corresponding mechanical part based on instructions from the information processing device 11. The wireless communication device 14 communicates with devices outside the mobile body 200. The sensors 15 detect various items of information. The sensors 15 may include, for example, a position sensor that obtains current positional information on the mobile body 200. In addition, the sensor 15 may include a speed sensor that detects the speed of the mobile body 200.

The drive device 16 includes various types of devices for causing the mobile body 200 to travel. The drive device 16 may include, for example, an engine, a steering device (steering), and a braking device (brakes). The lamp device 17 includes various types of lighting appliances installed in the mobile body 200. The lamp device 17 may include, for example, headlights (headlamps and headlights), directional indicator (blinker) lamps, backlights, brake lamps, and the like. The navigation device 18 is a device that guides a route to a destination by voice and display.

Figure 3:
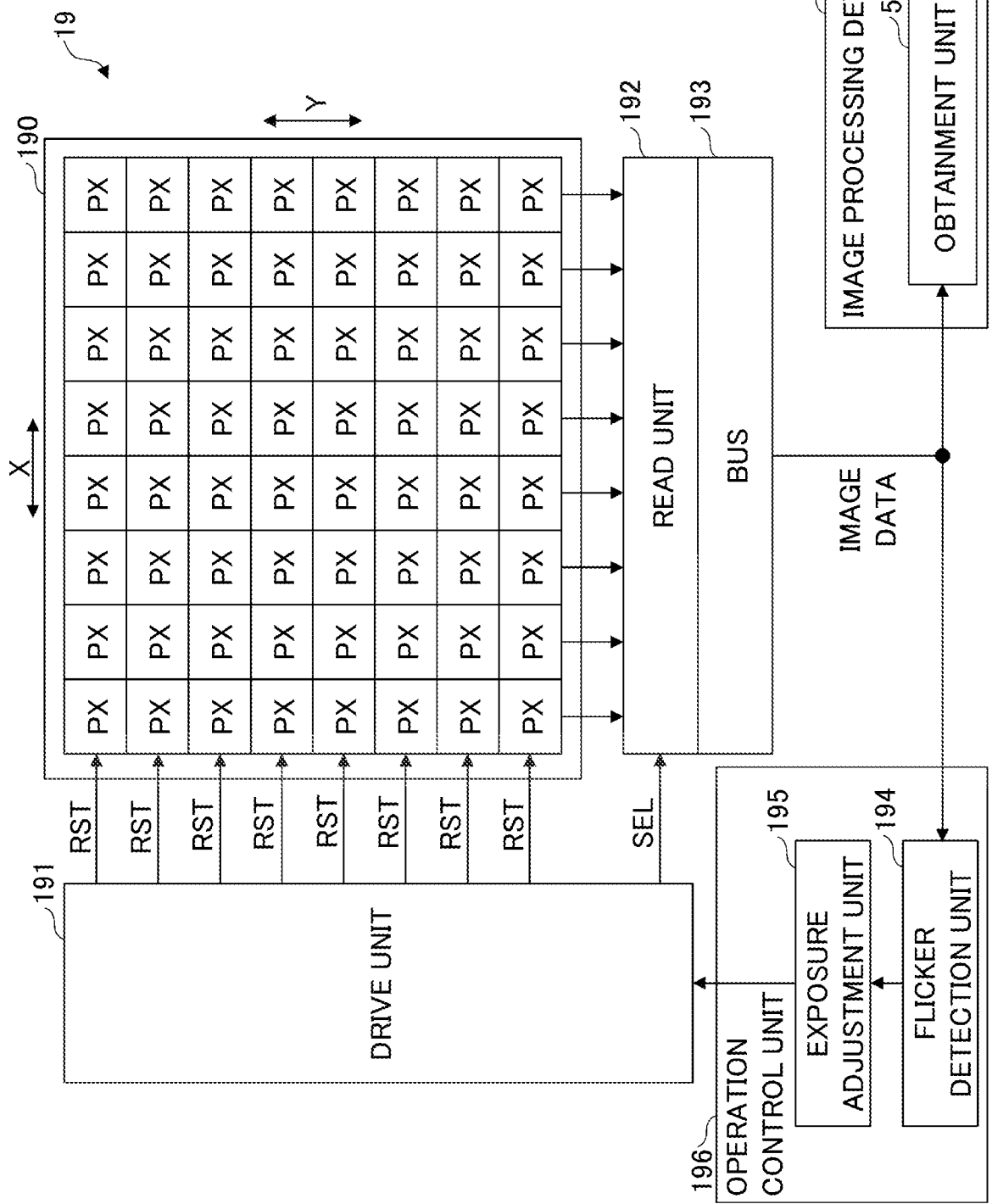
FIG. 3 is a block diagram illustrating an example of a configuration of an imaging device in FIG. 1.

FIG. 3 illustrates an example of a configuration of the imaging device 19 in FIG. 1. The imaging device 19 includes a pixel cell array 190, a drive unit 191, a read unit 192, a bus 193, and an operation control unit 196. The operation control unit 196 includes a flicker detection unit 194 and an exposure adjustment unit 195. The pixel cell array 190 is an example of an imaging element.

Note that among the imaging devices 19a to 19e illustrated in FIG. 1, at least the imaging device 19e or the imaging device 19a may have the configuration in FIG. 3. The remaining imaging devices 19 may have a configuration in which the flicker detection unit 194 and the exposure adjustment unit 195 illustrated in FIG. 3 are removed. Alternatively, the remaining imaging devices 19 may have the functions of the flicker detection unit 194 and the exposure adjustment unit 195 masked. A configuration in which the flicker detection unit 194 and the exposure adjustment unit 195 illustrated in FIG. 3 are removed, is illustrated, for example, as the imaging device 19C in FIG. 15.

The pixel cell array 190 includes multiple pixel cells PX arranged in a matrix. Although not illustrated, each pixel cell PX includes, for example, a photodiode, a reset transistor, and a source-follower transistor. The pixel cell array 190 is an example of an imaging element, and the pixel cell PX is an example of a photoelectric conversion element. Note that in FIG. 3, for the sake of simplicity, an example is illustrated in which the pixel cell array 190 includes 64 (8×8) pixel cells PX. In an actual imaging device 19, a pixel cell array 190 includes, for example, hundreds of thousands of pixels to millions of pixels.

The photodiode converts received light into an electric charge. The reset transistor turns on during a high-level period of a reset signal RST (FIG. 6), to set an accumulation node of the charge between the photodiode and the gate of the source-follower transistor, to a reset voltage. Note that a transfer transistor may be provided between the photodiode and the accumulation node, to control the accumulation time of the charge from the photodiode to the accumulation node. The source-follower transistor outputs an output voltage corresponding to the voltage level received at the gate to the read unit 192.

The drive unit 191 outputs a reset signal RST for each row of the pixel cells PX arranged in the X direction in FIG. 3. In addition, the drive unit 191 outputs a selection signal SEL to be used for reading pixel values from the pixel cells PX that receive the reset signal RST, to the read unit 192. Note that in the case where a transfer transistor is provided between the photodiode and the accumulation node in the pixel cell PX, the drive unit 191 outputs a transfer control signal to drive the transfer transistor for each pixel row (X) of the pixel cells PX that include a plurality of cells in the X direction as an example of one direction. In the following, the pixel row (X) is also referred to as a line.

The read unit 192 includes a read circuit (not illustrated) that includes a selection transistor and an amplifier for each pixel column (Y) of pixel cells PX arranged in the Y direction in FIG. 3. Each selection transistor outputs to the amplifier an output voltage, which is image information output from the corresponding source-follower transistors, while receiving a high-level selection signal SEL at the gates. The amplifier amplifies the output voltage received from the selection transistor, and outputs the amplified output voltage as image data via the bus 193. The image data is obtained by an obtainment unit 51 of the image processing device 10.

The flicker detection unit 194 executes flicker detection processing by monitoring the pixel value of each pixel cell PX included in image data. Further, in the case where there is a pixel cell PX whose pixel value changes periodically, the flicker detection unit 194 detects an occurrence of a flicker, and notifies the exposure adjustment unit 195 of the position of the pixel cell PX where the flicker occurs. For example, a flicker occurs depending on the emission period of a light source such as a traffic signal, an illumination, a headlight of an automobile, or the like.

In the case of receiving notice of an occurrence of a flicker from the flicker detection unit 194, the exposure adjustment unit 195 executes exposure adjustment processing to make the drive frequency (in other words, the number of times of exposures) of a pixel row (X) including the flicker-occurred pixel cell PX higher than usual in the drive unit 191. The drive unit 191 sets the drive frequency of the reset signal RST and the selection signal SEL corresponding to the pixel row (X) including the pixel cell PX where the flicker occurs, higher than usual. Accordingly, as will be described with FIG. 6, the exposure time of the pixel row (X) including the pixel cell PX in which the flicker is detected is set longer than the exposure time of the other pixel rows (X).

Note that the flicker detection unit 194 and the exposure adjustment unit 195 may be installed in the image processing device 10 instead of being installed in the operation control unit 196. In this case, the flicker detection unit 194 of the image processing device 10 that obtains image data via the obtainment unit 51 detects an occurrence of a flicker. In the case of receiving notice of an occurrence of a flicker from the flicker detection unit 194, the exposure adjustment unit 195 of the image processing device 10 outputs control information to the operation control unit 196. Further, the operation control unit 196 controls the drive unit 191 to make the drive frequency of the pixel row (X) including the pixel cell PX where the flicker occurs higher than usual.

Figure 4:
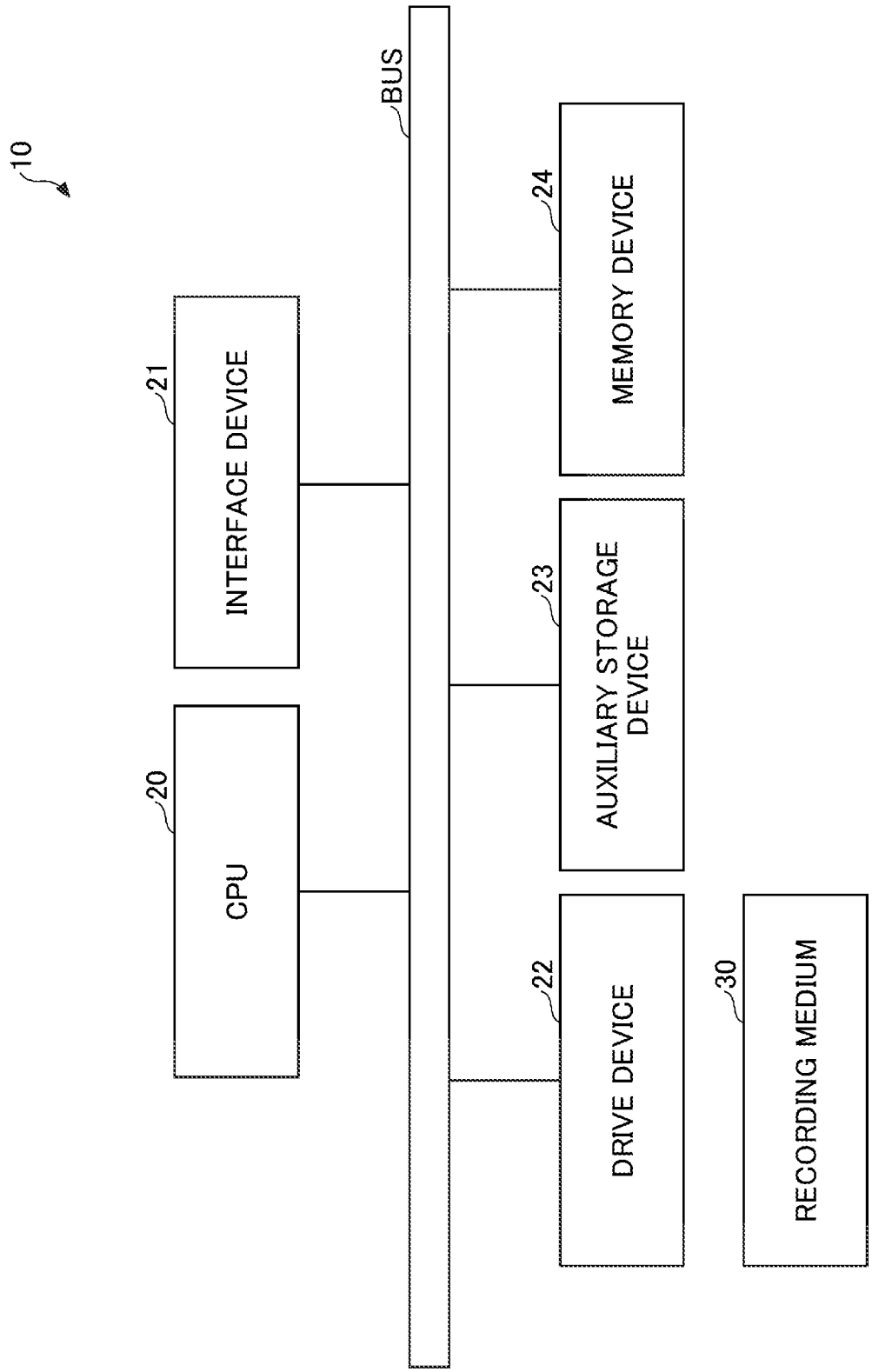
FIG. 4 is a block diagram illustrating an example of a configuration of the image processing device in FIG. 2.

FIG. 4 illustrates an example of a configuration of the image processing device 10 in FIG. 2. Note that the configuration of the information processing device 11 in FIG. 2 is also substantially the same as in FIG. 4. The image processing device 10 includes a central processing unit (CPU) 20, an interface device 21, a drive device 22, an auxiliary storage device 23, and a memory device 24 that are connected to each other by a bus BUS.

The CPU 20 executes various types of image processing that will be described later, by executing an image processing program stored in the memory device 24. The interface device 21 is used for connecting to a network (not illustrated). The auxiliary storage device 23 is, for example, a hard disk drive (HDD) or solid state drive (SSD), to hold an image processing program, image data, various parameters used for image processing, and the like.

The memory device 24 is, for example, a dynamic random access memory (DRAM) or the like, to hold an image processing program or the like transferred from the auxiliary storage device 23. The drive device 22 includes an interface to connect a recording medium 30, to transfer an image processing program stored in the recording medium to the auxiliary storage device 23, for example, based on instructions from the CPU 20. Note that the drive device 22 may transfer image data or the like stored in the auxiliary storage device 23 to the recording medium 30.

Figure 5:
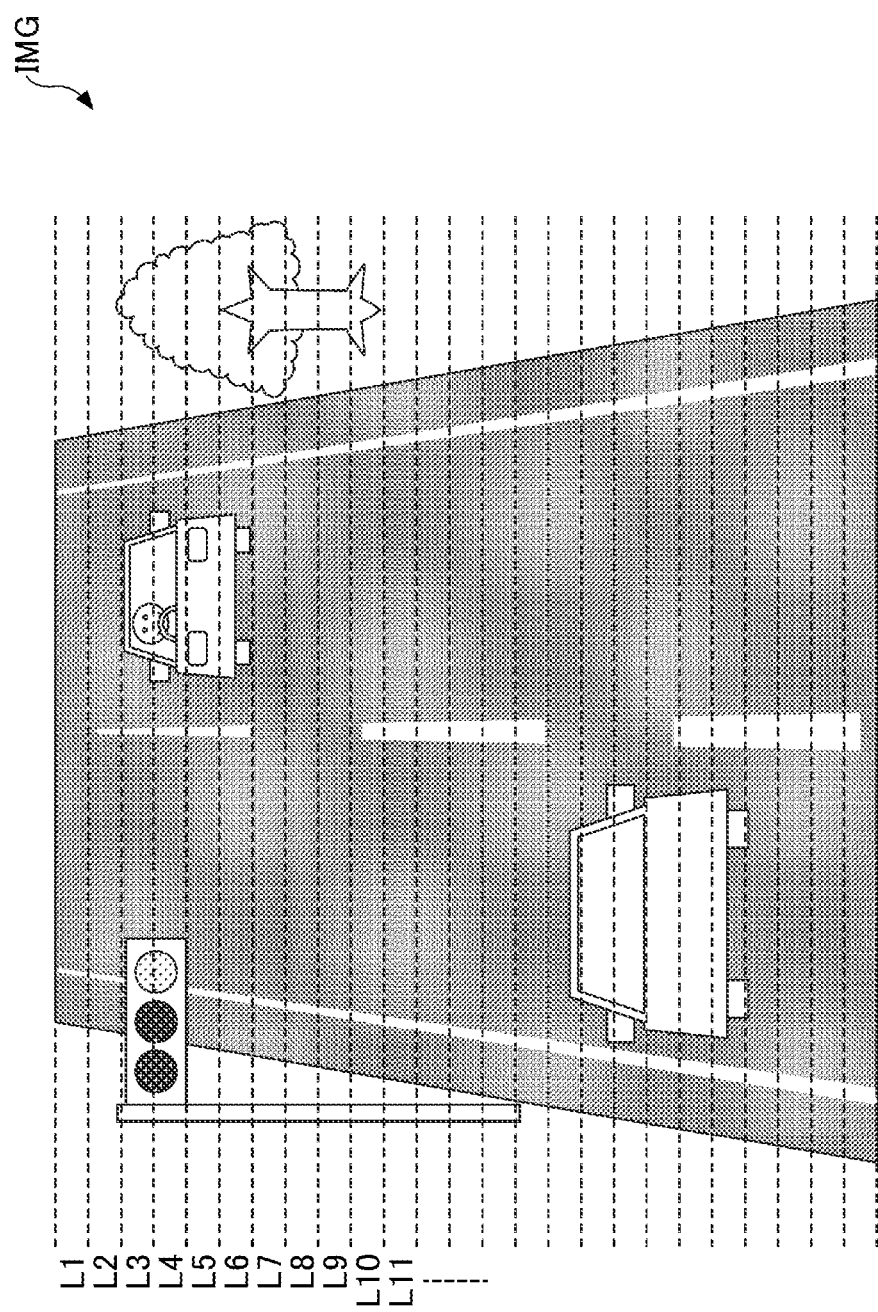
FIG. 5 is an explanatory diagram illustrating an example of an image obtained by the imaging device 19 in FIG. 1.

FIG. 5 illustrates an example of an image IMG obtained by the imaging device 19 in FIG. 1. For example, FIG. 5 is obtained by the imaging device 19e installed in the front of the mobile body 200. Note that reference numerals L1 to L11 indicate line numbers of the pixel columns (X) that are added for reference and not included in the image IMG. Note that in order to simplify the description, the pixels row (X) are illustrated to be enlarged vertically in the image IMG.

The image in FIG. 5 includes two vehicles traveling on a road, a traffic signal, and a tree. The traffic signal includes green, yellow, and red lights arranged in order from the left side of the image IMG. In the example in FIG. 5, green and yellow lights in a dark color indicate that these are turned off, and a red light in a bright color indicates that this is turned on. For example, each of the green, yellow, and red lights is lit using light emitting diode (LED) light sources. The LED light source is a cause of the occurrence of a flicker because it flashes repeatedly in predetermined periods.

The flicker detection unit 194 in FIG. 3 detects a flicker of the lit red light of the signal, and notifies the exposure adjustment unit 195 of the line numbers L3 and L4 including the red light. Based on the notice from the flicker detection unit 194, the exposure adjustment unit 195 controls the drive unit 191 to increase the exposure time of the lines (pixel row (X)) L3 and L4 more than the exposure time of the other lines. For example, the increase in exposure time is done by increasing the number of times of exposures in one-frame period.

Figure 6:
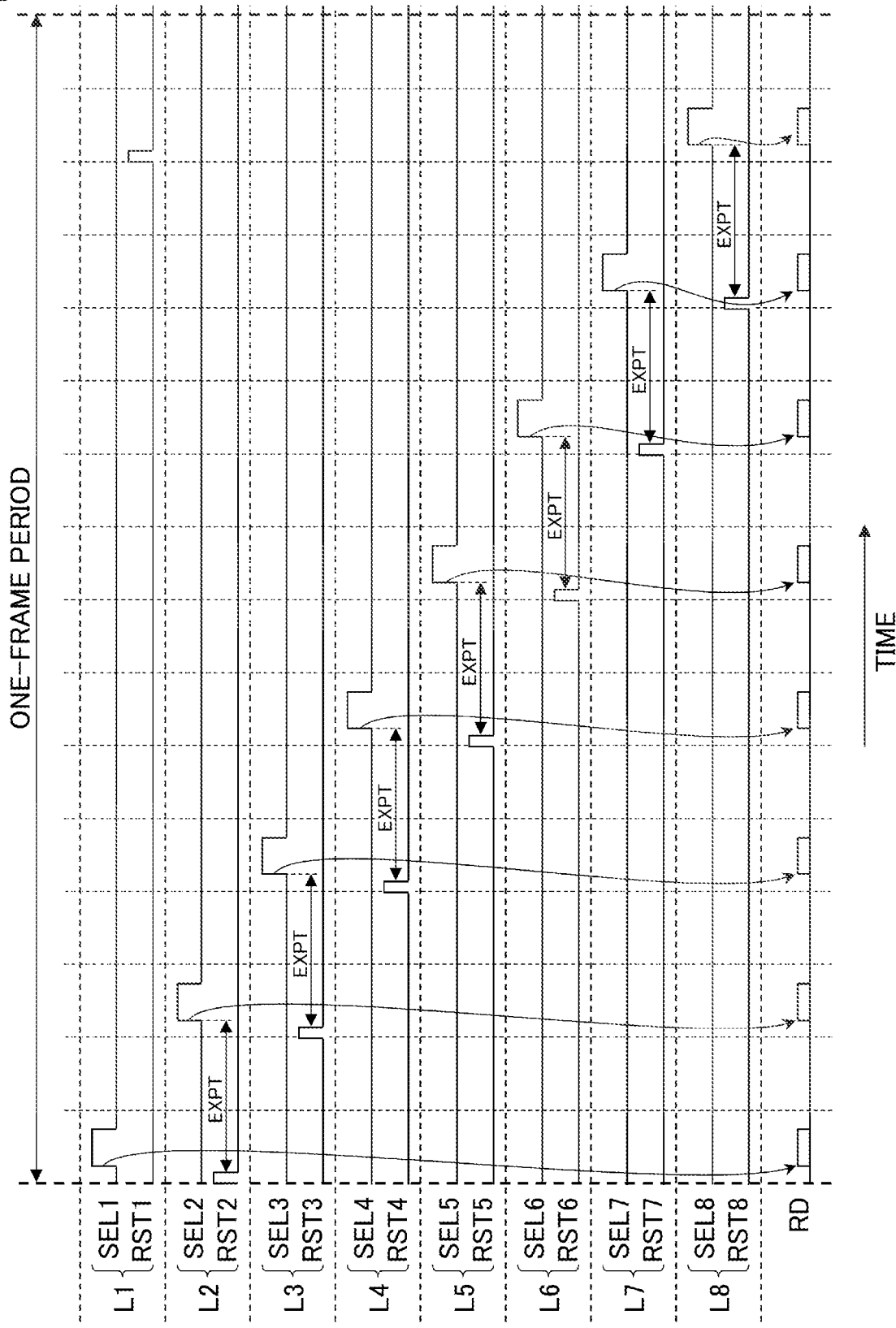
FIG. 6 is a timing chart illustrating an example of operations of an imaging device in the case where the flicker detection unit in FIG. 3 does not detect a flicker.

FIG. 6 illustrates an example of operations of the imaging device 19 in the case where the flicker detection unit 194 in FIG. 3 does not detect a flicker. Also, in FIG. 6, it is assumed that the imaging device 19 includes 64 pixels. Further, the imaging device 19 obtains an image by a rolling shutter method in which pixel cells PX of all lines L1 to L8 are sequentially exposed in one-frame period.

In the case where no flicker occurs, the drive unit 191 in FIG. 3 sequentially outputs reset signals RST (RST1 to RST8) each including a high-level pulse. The reset signals RST are generated so as not to overlap among lines L1 to L8. The accumulation node of a pixel cell PX that received the reset signal RST is reset, and then accumulates the charge from the photodiode.

In addition, after an exposure time EXPT has elapsed from the output of the reset signal RST, the drive unit 191 sets a selection signal SEL (SEL1 to SEL8) to a high level for a predetermined period. The selection signals SEL are generated so as not to overlap among the lines L1 to L8. In response to the high-level selection signal SEL, the read unit 192 in FIG. 3 amplifies the output voltage output from the corresponding pixel cell PX, to generate read data RD.

Further, the imaging device 19 outputs the sequentially generated read data RD to the image processing device 10 or the like in FIG. 2, as image data. For example, the image data may be output from the imaging device 19 to the image processing device 10 for each frame as an image to be displayed on a screen of the display device 12 in FIG. 2. The image processing device 10 executes image processing of the image data received from the imaging device 19.

Figure 7:
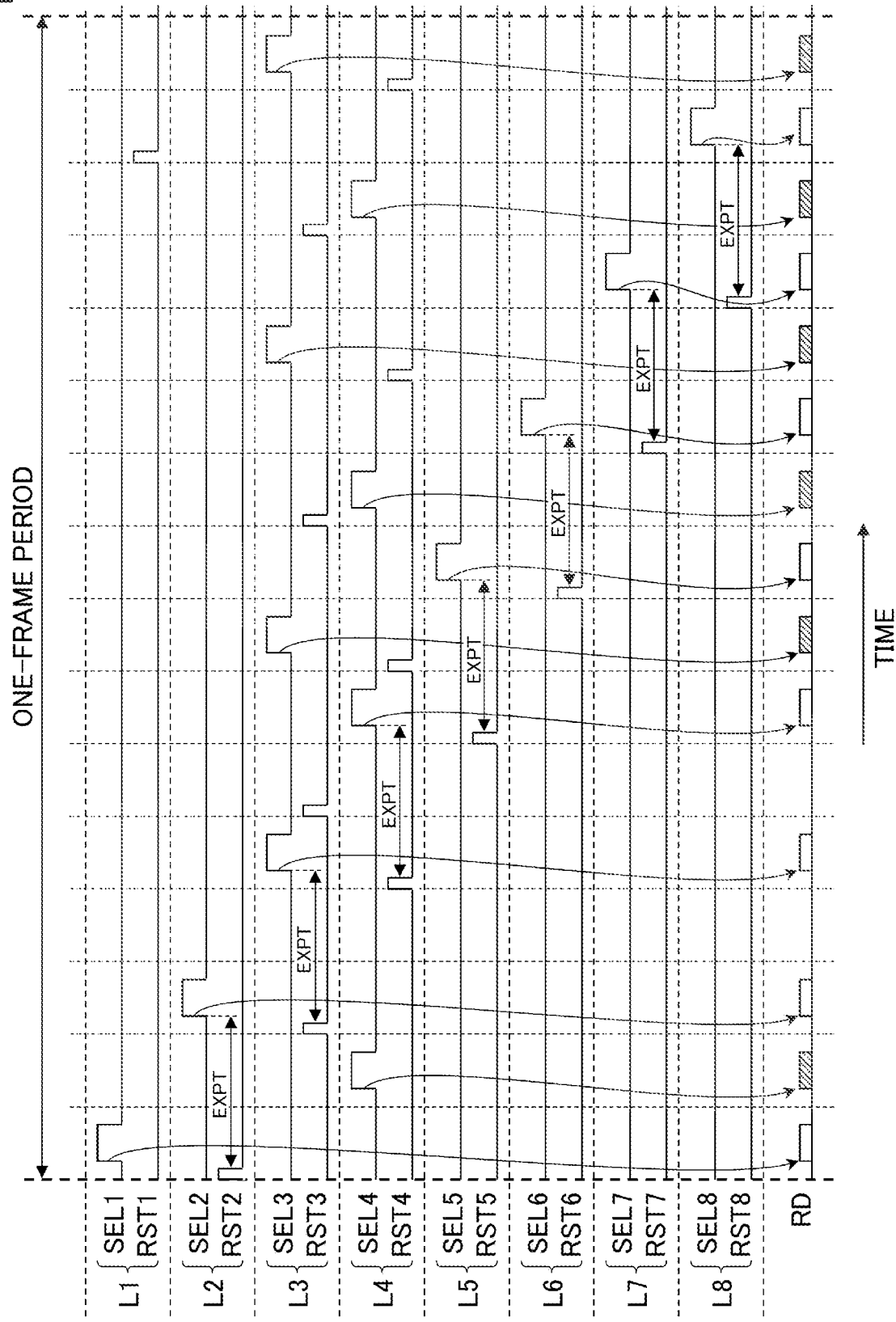
FIG. 7 is a timing chart illustrating an example of operations of the imaging device when the flicker detection unit in FIG. 3 detects a flicker.

FIG. 7 illustrates an example of operations of the imaging device 19 in the case where the flicker detection unit 194 in FIG. 3 detects a flicker. Detailed description will be omitted for elements that are substantially the same as in FIG. 6. In FIG. 7, in the image IMG in FIG. 5, an example of operations when a flicker is detected in images of the lines L3 and L4 is illustrated.

The drive unit 191 in FIG. 3 increases the number of times of generation of the reset signals RST and the selection signals SEL corresponding to the lines L3 and L4 where the flicker is detected, from the number of times of generation illustrated in FIG. 6, based on control by the exposure adjustment unit 195. Note that the reset signals RST are generated so as not to overlap each other, and the selection signals SEL are generated so as not to overlap each other.

Accordingly, read data RD from the lines L3 and L4 are added, as indicated by shaded rectangles in FIG. 7. Each time the pixel cell array 190 is driven by the drive unit 191, the read unit 192 synthesizes multiple items of read data RD in each of the lines L3 and L4, and outputs the synthesized data to the image processing device 10 as the image data. In other words, in the one-frame period, the exposure time of the lines L3 and L4 is increased more than that of the other lines by increasing the number of times of exposures. The flicker generated in the lines L3 and L4 can be locally suppressed by increasing the exposure time.

Note that the brightness of images of the lines L3 and L4 captured with the increased exposure time becomes higher than that of images of the other lines. Therefore, the imaging device 19 may execute gain adjustment processing to decrease the pixel values of the image data of the lines L3 and L4 according to the increase ratio of the exposure time of the lines L3 and L4.

Figure 8:
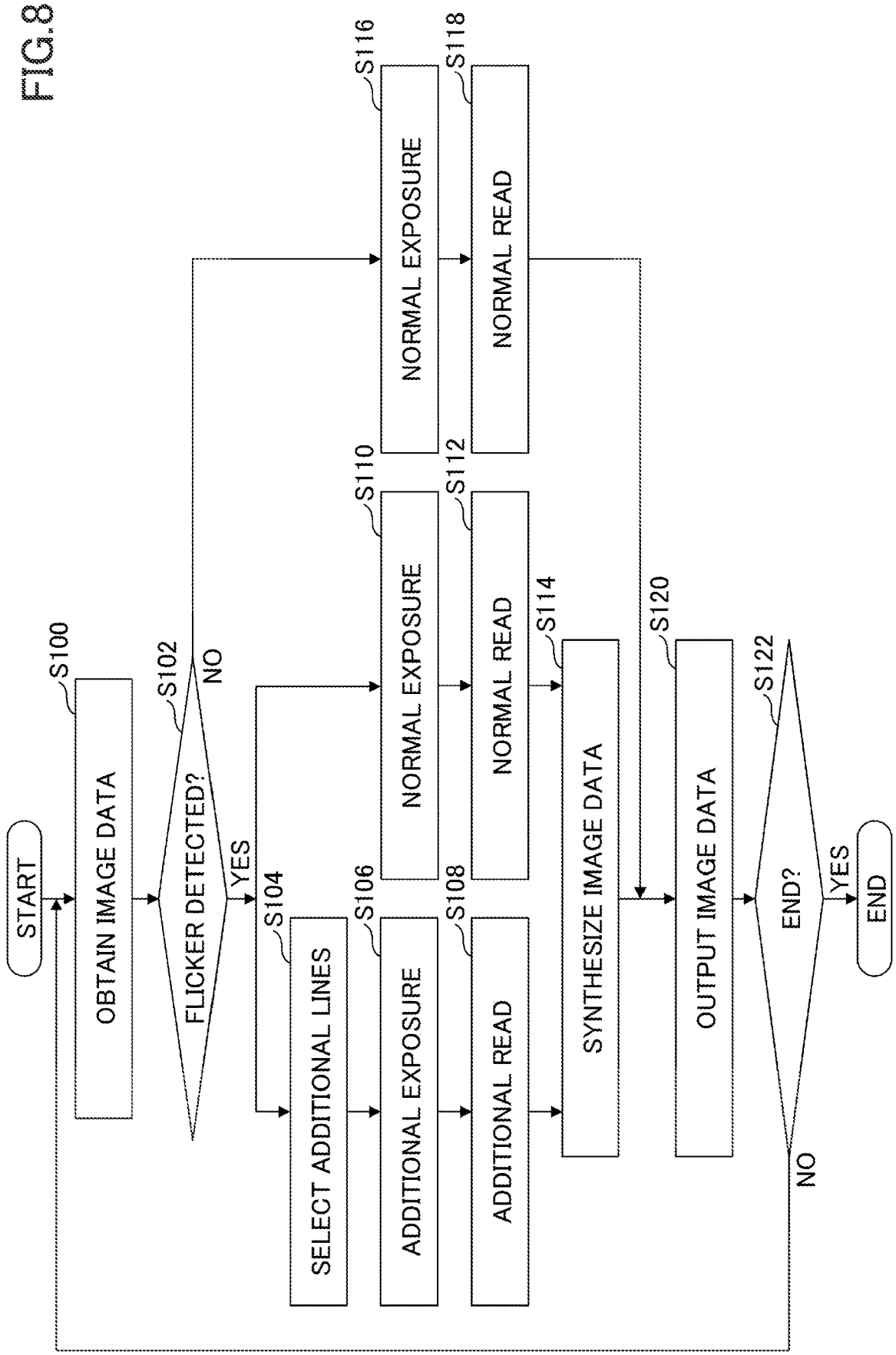
FIG. 8 is a flow chart illustrating an example of operations of the imaging device in FIG. 3.

FIG. 8 illustrates an example of operations of the imaging device 19 in FIG. 3. In other words, FIG. 8 illustrates an example of an image processing method of the imaging device 19. For example, operations illustrated in FIG. 8 may be implemented by a control program executed by the CPU installed in the imaging device 19 or by hardware installed in the imaging device 19. The operations illustrated in FIG. 8 are started based on, for example, activation of the imaging device 19 upon power-up.

First, at Step S100, the operation control unit 196 of the imaging device 19 controls the drive unit 191 and the read unit 192, to obtain image data frame by frame. Next, at Step S102, the flicker detection unit 194 detects presence or absence of a flicker by comparing the obtained image data with, for example, image data of at least one frame earlier.

In the case where the flicker detection unit 194 detects a flicker, the operation control unit 196 executes Steps S104, S106, and S108 in parallel with Steps S110 and S112. In the case where the flicker detection unit 194 does not detect a flicker, the operation control unit 196 executes Step S116. Note that in a process executed at Step S102 for a first predetermined frame after the activation of the imaging device 19, the operation control unit 196 may determine that no flicker is detected, to execute Step S116.

At Step S104, the operation control unit 196 selects additional lines to which exposure is added. In the examples illustrated in FIGS. 5 and 7, the additional lines are L3 and L4. Next, at Step S106, the operation control unit 196 executes additional exposures to the additional lines. Next, at Step S108, the operation control unit 196 executes additional reads for the additional lines, and then, executes Step S114.

At Step S110, the operation control unit 196 executes normal exposures. Next, at Step S112, the operation control unit 196 executes normal reads, and then, executes Step S114. Note that as illustrated in FIG. 7, the operations of Steps S110 and S112 are executed by a rolling shutter method, and the operations of Steps S106 and S108 are executed in parallel with the operations of Steps S110 and S112.

At Step S114, the operation control unit 196 generates one frame of image data by synthesizing the image data obtained in the additional reads and the normal reads. For example, the operation control unit 196 generates image data by adding pixel values of the image data obtained by the additional reads and pixel values of the image data obtained by the normal reads.

Note that instead of adding the pixel values, the operation control unit 196 may execute processing such as averaging the pixel values. Further, the operation control unit 196 may add or average pixel values only in the vicinity of an area in which the flicker is detected.

On the other hand, in the case where no flicker is detected, at Step S116, the operation control unit 196 executes normal exposures by the rolling shutter method as illustrated in FIG. 6. Next, at Step S118, the operation control unit 196 executes normal reads of pixel information from the pixel cell array 190, to generate one frame image, and then, executes Step S120.

At Step S120, the operation control unit 196 outputs the one frame of image data generated at Step S114 or Step S118 to the image processing device 10 or the like. Next, at Step S122, the operation control unit 196 determines whether to end image obtainment processing. If ending the image obtainment processing, the operation control unit 196 ends the operations illustrated in FIG. 8. If continuing the image obtainment processing, the operation control unit 196 executes the operation at Step S100.

Note that the synthesis processing of the image data at Step S114 that is executed when a flicker is detected, may be executed by the image processing device 10. In this case, when a flicker is detected, at Step S120, in addition to the image data obtained by the normal reads, the operation control unit 196 outputs the image data obtained by the additional reads together with the line numbers L, to the image processing device 10. Further, the processing illustrated in FIG. 8 may be executed in the image processing device 10.

As above, in this embodiment, based on detection of a flicker, image processing to suppress a flicker can be executed locally at lines where the flicker occurs. Accordingly, for example, compared with the case where the flicker is suppressed by increasing the exposure time all over the pixel cell array 190, side effects such as a blur of an image of a moving subject can be suppressed. For example, in the image IMG illustrated in FIG. 5, an occurrence of a blur of the vehicle traveling toward the traffic signal can be suppressed by flicker suppression processing.

In addition, by executing image processing to suppress a flicker locally, the load of image processing by the operation control unit 196 can be reduced, compared with the case where image processing to suppress the flicker is executed on the entire image data of one frame. Further, image processing to reduce the flicker is executed by the imaging device 19; therefore, an increase in the load of image processing by the image processing device 10 can be suppressed. In addition, the image processing system 100 can be built using an existing image processing device 10.

Second Embodiment

Figure 9:
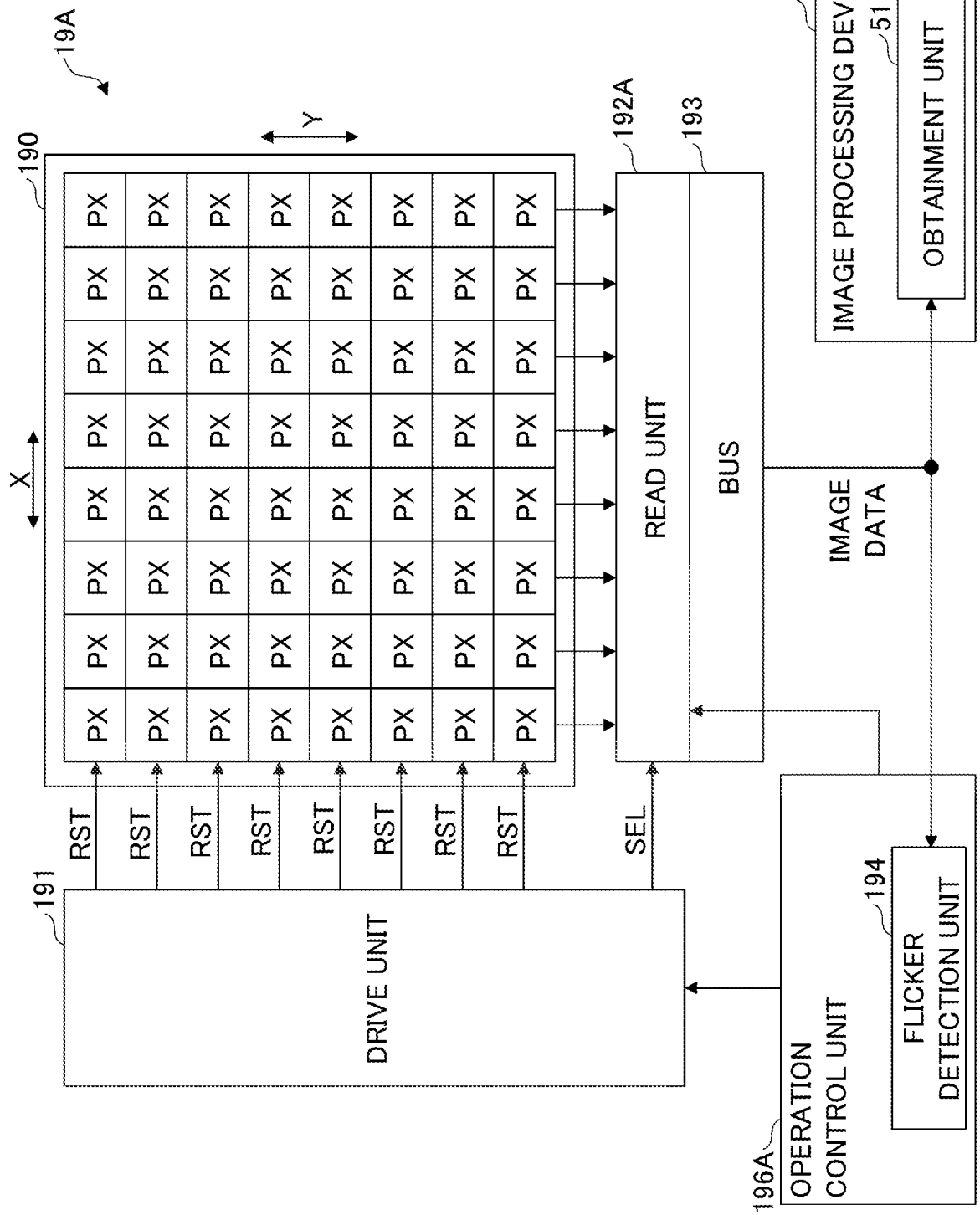
FIG. 9 is a block diagram illustrating an example of a configuration of an imaging device included in an image processing system according to a second embodiment.

FIG. 9 illustrates an example of a configuration of an imaging device included in an image processing system according to a second embodiment. Elements that are substantially the same as those in the embodiment described above are assigned the same reference numerals, and detailed description will be omitted. In the image processing system 100, elements except for the imaging device 19A are substantially the same as those in FIGS. 1, 2 and 4. For example, among the imaging devices 19a to 19e in FIG. 1, at least the imaging device 19e is replaced with the imaging device 19A illustrated in FIG. 9.

The imaging device 19A includes an operation control unit 196A that does not include the exposure adjustment unit 195, in place of the operation control unit 196 in FIG. 3. The imaging device 19A includes a read unit 192A in place of the read unit 192 in FIG. 3. The other elements of the imaging device 19A are substantially the same as those of the imaging device 19 in FIG. 3.

The imaging device 19A includes a function of obtaining an image by a rolling shutter method. However, the imaging device 19A includes a function of setting the exposure processing of an exposure time EXPT to be executed multiple times, for example, twice, for one frame, as compared with the normal rolling shutter system illustrated in FIG. 6. In a pixel row (X) in which the flicker detection unit 194A does not detect an occurrence of a flicker, the operation control unit 196A causes the read unit 192A to select pixel information obtained by one time of the exposure time EXTP. In the pixel row (X) in which the flicker detection unit 194A detects an occurrence of a flicker, the operation control unit 196A causes the read unit 192A to select pixel information obtained by two times of the exposure time EXTP. Note that in the exposure processing executed multiple times for one frame, each exposure time may be different from one another.

Figure 10:
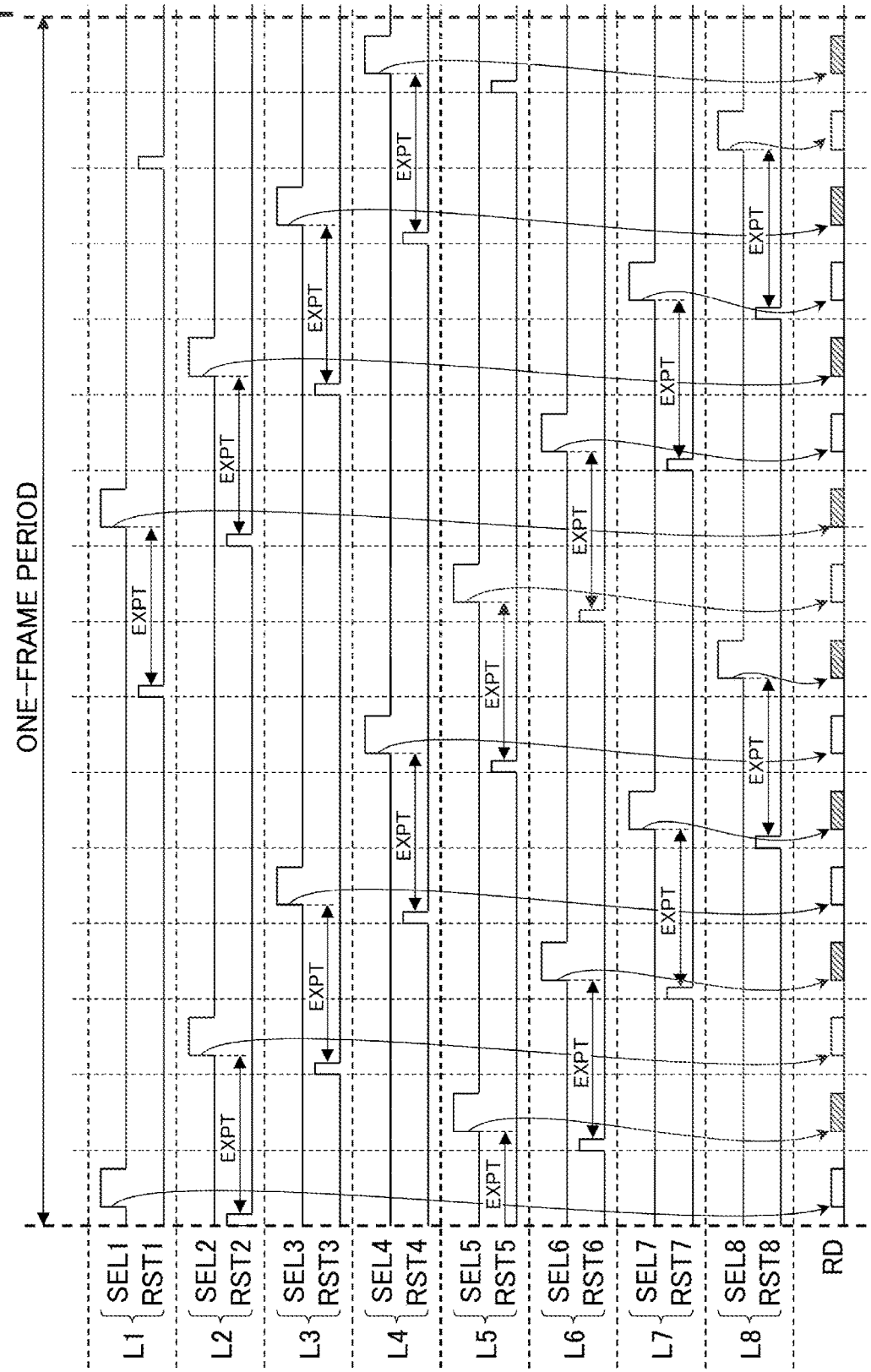
FIG. 10 is a timing chart illustrating an example of operations of the imaging device in FIG. 9.

FIG. 10 illustrates an example of operations of the imaging device 19A in FIG. 9. Detailed description will be omitted for substantially the same operations as in FIG. 7. The operation control unit 196A of the imaging device 19A executes control to generate twice a pair of reset signal RST and selection signal SEL for each line L1 to L8. Since each line L1 to L8 is driven multiple times (twice) in one-frame period, the read unit 192 receives pixel information from each line L1 to L8 for the multiple times in the one-frame period. Therefore, the pixel value of each pixel cell PX included in read data RD obtained in the one-frame period is twice the pixel value obtained in the one-frame period in the normal rolling shutter system illustrated in FIG. 6.

Note that the generation period of the reset signal RST and the generation period of the selection signal SEL in each line L1 to L8 are set to one half of the one-frame period. Accordingly, the exposure interval of the pixel cell PX in each line L1 to L8 can be set to a maximum interval that is uniform and settable. Therefore, an occurrence of a flicker can be suppressed by synthesizing read data (pixel values) that will be described with FIG. 11. Note that in the read data RD illustrated in FIG. 10, a blank rectangle indicates read data RD by a normal exposure, and a shaded rectangle indicates read data RD by an additional exposure.

Figure 11:
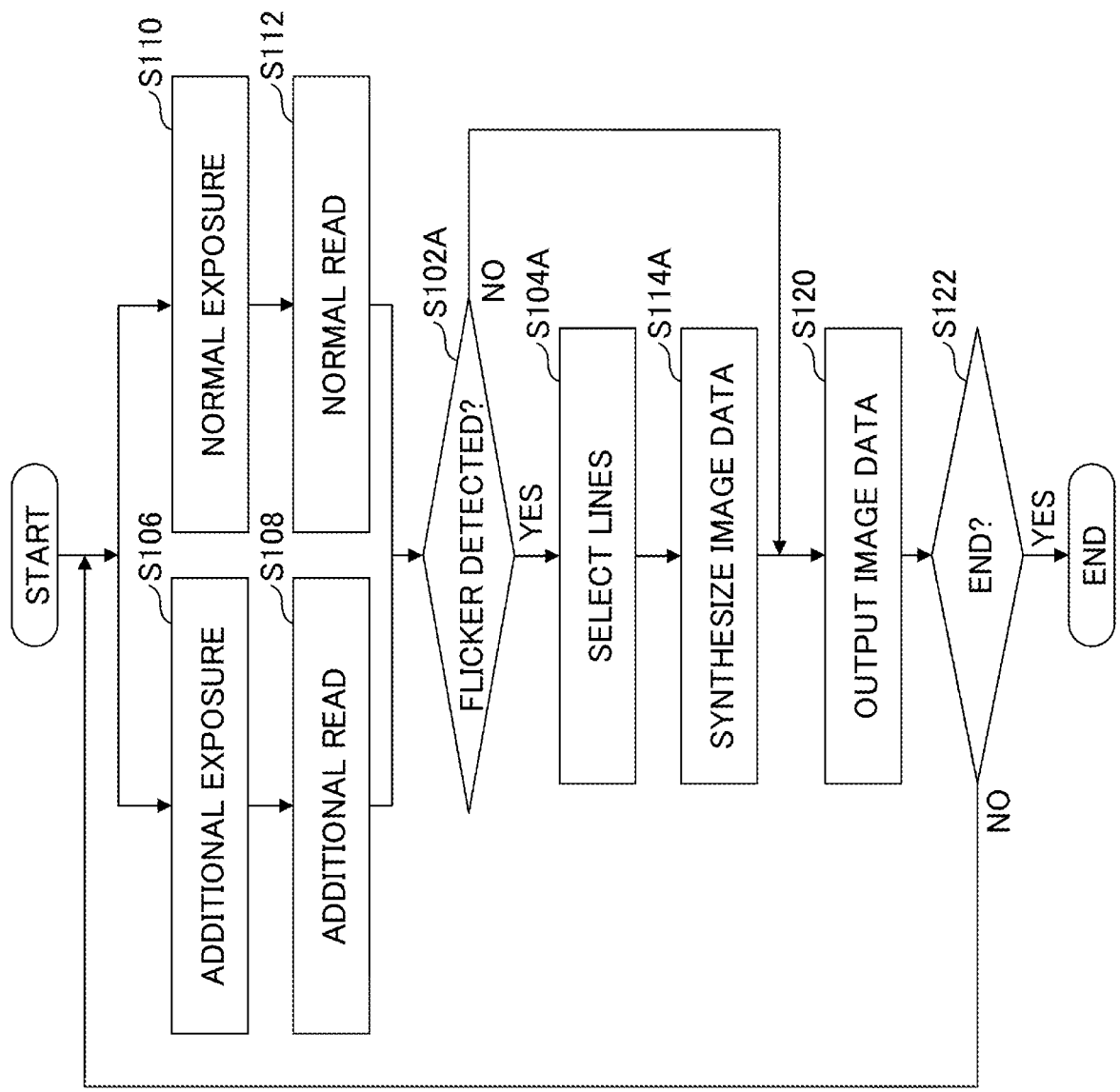
FIG. 11 is a flow chart illustrating an example of operations of the imaging device in FIG. 9.

FIG. 11 illustrates an example of operations of the imaging device 19A in FIG. 9. In other words, FIG. 11 illustrates an example of an image processing method of the imaging device 19A. Operations substantially the same as those in FIG. 8 are assigned the same step numbers, and detailed description will be omitted. For example, operations illustrated in FIG. 11 may be implemented by a control program executed by the CPU installed in the imaging device 19 or by hardware installed in the imaging device 19. The operations illustrated in FIG. 11 are started based on, for example, activation of the imaging device 19 upon power-up.

In this embodiment, first, at Steps S106 and S110, the operation control unit 196A executes additional exposures and normal exposures in parallel (or alternately). Next, at Steps S108 and S112, the operation control unit 196A executes additional reads and normal reads in parallel (alternately). In other words, the operation control unit 196 executes operations illustrated in FIG. 10 by Steps S106, S108, S110, and S112.

Next, at Step S102A, the flicker detection unit 194 compares the image data obtained at Steps S108 and S112 with, for example, image data of at least one frame earlier to detect presence or absence of a flicker for each line. The operation control unit 196A executes Step S104A for a line where the flicker detection unit 194 detects an occurrence of a flicker. The operation control unit 196A executes Step S120 for a line where the flicker detection unit 194 does not detect an occurrence of a flicker.

In other words, the operation control unit 196A does not synthesize the image data at Step S114A for a line in which an occurrence of a flicker is not detected. Further, the operation control unit 196A outputs image data obtained by the normal reads, which is part of pixel information that the read unit 192A receives multiple times from the pixel cell array 190 for the respective lines. Note that in a process executed at Step S102A for a first predetermined frame after activation of the imaging device 19, the operation control unit 196 may determine that an occurrence of a flicker is not detected in all pixel rows (X), to execute Step S120.

At Step S104A, the operation control unit 196A selects lines of the pixel rows (X) where an occurrence of a flicker is detected. For example, in the example illustrated in FIG. 5, lines L3 and L4 are selected. Note that the operation control unit 196A may execute gain adjustment processing to decrease pixel values according to the increase ratio of the additional exposure time in the selected lines. In addition, the operation control unit 196A may execute processing such as averaging pixel values in place of adding pixel values in the selected lines. Further, the operation control unit 196 may add or average pixel values only in the vicinity of an area in which the flicker is detected.

Next, at Step S114A, for the lines L selected at Step S104A, the operation control unit 196A causes the read unit 192A to synthesize image data items obtained by the normal exposures and by the additional exposures, respectively, to generate image data of two times of the exposure time EXTP. By doubling the exposure time EXTP, an occurrence of a flicker can be suppressed. The operation control unit 196A executes Step S120 after Step S114A. At Step S120, the operation control unit 196A causes the image processing device 10 or the like to output one frame of image data generated by the read unit 192A. Note that for pixel rows (X) in which an occurrence of a flicker is not detected, the operation control unit 196A causes the read unit 192A to generate image data obtained by normal exposures (image data of one time of the exposure time EXTP).

Next, at Step S122, the operation control unit 196A determines whether to end image obtainment processing, and if ending the image obtainment processing, the operation control unit 196A ends the operation illustrated in FIG. 11. If continuing the image obtainment processing, the operation control unit 196A executes the operations at Steps S106 and S110.

Note that processing at Steps S102A, S104A, and S114A may be executed on the image processing device 10. In this case, the operation control unit 196A does not execute flicker determination, and instead, causes the operation control unit 196A and the read unit 192A to synthesize image data items obtained by the normal exposures and by the additional exposures, respectively, for all the pixel rows (X), to generate image data of two times of the exposure time EXTP, and to execute processing at Step S120.

As above, also in this embodiment, substantially the same effects as in the embodiment described above can be obtained. For example, based on detection of a flicker, image processing to suppress the flicker can be executed locally at lines where the flicker occurs. Accordingly, for example, compared with the case where the flicker is suppressed by increasing the exposure time all over the pixel cell array 190, side effects such as a blur of an image of a moving subject can be suppressed.

Further, in this embodiment, the operation control unit 196A always executes the operations illustrated in FIG. 10 with or without detection of an occurrence of a flicker by the flicker detection unit 194A. In other words, the operation control unit 196A does not need to switch operations between those illustrated in FIG. 6 and those illustrated in FIG. 7, depending on presence or absence of detection of an occurrence of a flicker to be detected by the flicker detection unit 194A. Accordingly, the configuration of the operation control unit 196A can be simplified compared with that of the operation control unit 196 in FIG. 3. For example, the exposure adjustment unit 195 in FIG. 3 can be eliminated.

Third Embodiment

Figure 12:
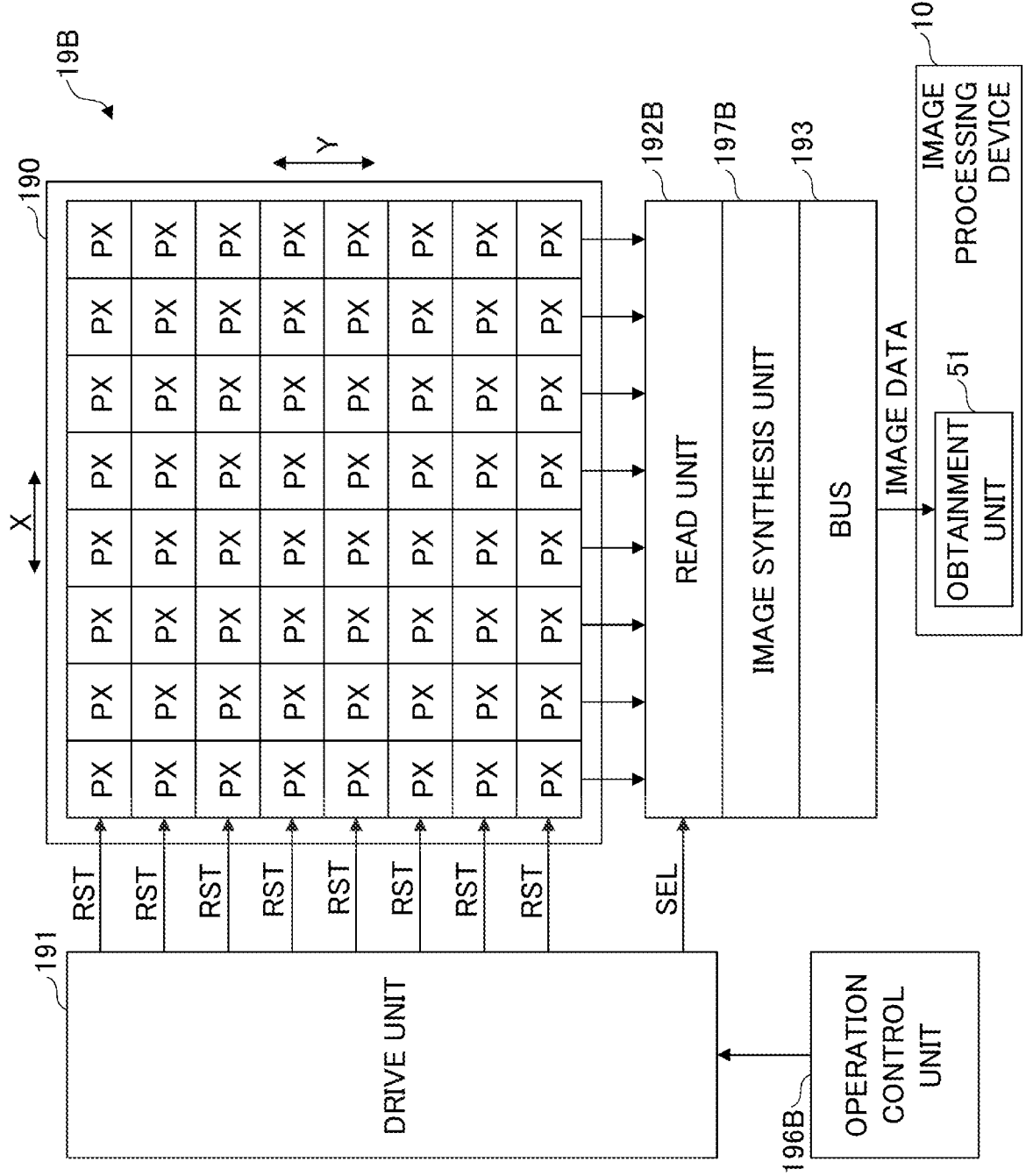
FIG. 12 is a block diagram illustrating an example of a configuration of an imaging device included in an image processing system according to a third embodiment.

FIG. 12 illustrates an example of a configuration of an imaging device included in an image processing system according to a third embodiment. Elements that are substantially the same as those in the embodiments described above are assigned the same reference numerals, and detailed description will be omitted. In the image processing system 100, elements except for an imaging device 19B is substantially the same as those in FIGS. 1, 2 and 4. For example, among the imaging devices 19a to 19e in FIG. 1, at least the imaging device 19e is replaced with the imaging device 19B illustrated in FIG. 12.

The imaging device 19B includes an operation control unit 196B that does not include the flicker detection unit 194 and the exposure adjustment unit 195, in place of the operation control unit 196 in FIG. 3. The imaging device 19B includes a read unit 192B in place of the read unit 192 in FIG. 3. In addition, the imaging device 19B includes an image synthesis unit 197B between the read unit 192B and the bus 193. The other elements of the imaging device 19B are substantially the same as those of the imaging device 19 in FIG. 3.

The imaging device 19B, like the imaging device 19A in FIG. 9, includes a function of setting the exposure processing with the exposure time EXPT to be executed multiple times, for example, twice, in one frame, as compared with the normal rolling shutter system illustrated in FIG. 6. The operation control unit 196B controls the overall operations of the imaging device 19B including the drive unit 191, the image synthesis unit 197B, and the like, to cause the imaging device 19B to operate at substantially the same timings as illustrated in FIG. 10. Note that in the exposure processing executed multiple times for one frame, each exposure time may be different from one another.

As illustrated in FIG. 10, the read unit 192B alternately obtains read data RD by the normal exposures and read data by the additional exposures, and outputs the obtained read data RD to the image synthesis unit 197B. The image synthesis unit 197B uses the two items of read data RD from the read unit 192B to synthesize the pixel value for each pixel. The image synthesis unit 197B outputs image data generated by synthesizing the pixel values, to the image processing device 10 via the bus. The synthesis process of pixel values will be described with FIG. 13.

Figure 13:
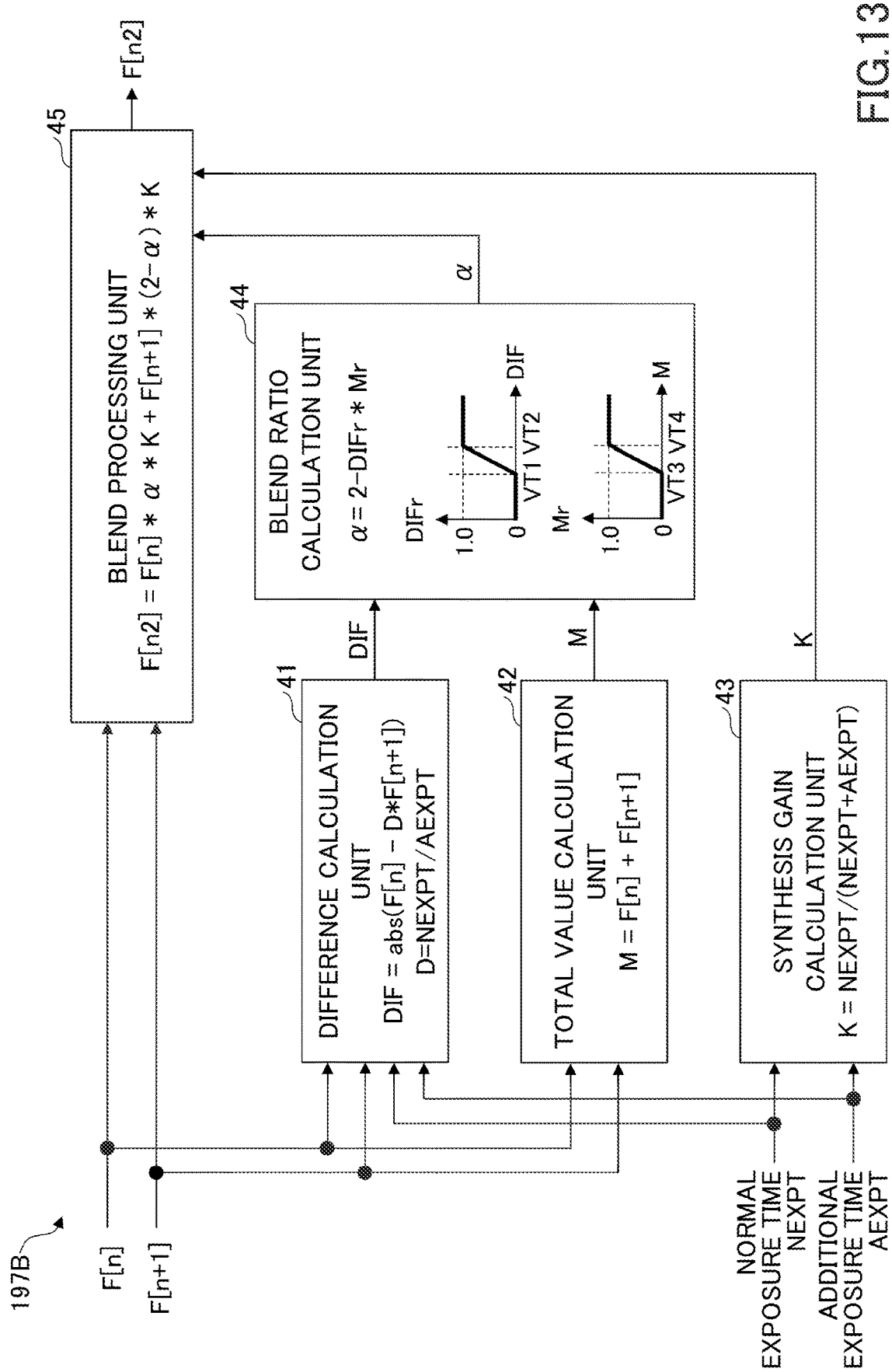
FIG. 13 is a block diagram illustrating an example of an image synthesis unit in FIG. 12.

FIG. 13 illustrates an example of the image synthesis unit 197B in FIG. 12. The image synthesis unit 197B includes a difference calculation unit 41, a total value calculation unit 42, a synthesis gain calculation unit 43, a blend ratio calculation unit 44, and a blend processing unit 45. For example, the image synthesis unit 197B includes multiple instances of the configuration illustrated in FIG. 13, and executes synthesis processing of pixel values of multiple pixels in parallel. The difference calculation unit 41, the total value calculation unit 42, and the blend ratio calculation unit 44 constitute an example of a flicker detection unit that detects a flicker area in which a flicker occurs, based on multiple items of image data obtained at different timings. The blend processing unit 45 is an example of a synthesis processing unit that synthesizes multiple items of image data obtained at different timings in a flicker area.

In FIG. 13, a symbol F[n] indicates a pixel value of each pixel by the normal exposure, and a symbol F[n+1] indicates a pixel value of each pixel by the additional exposure. Normal and additional exposures are the same as the normal and additional exposures described in FIG. 10. In the following, the symbol F[n] is referred to as a pixel value F[n] or a normal pixel value F[n], and the symbol F[n+1] is referred to as a pixel value F[n+1] or an additional pixel value F[n+1].

The difference calculation unit 41 calculates an absolute value (abs) of the difference between a pixel value F[n] and a value obtained by multiplying a pixel value F[n+1] by an exposure ratio D as a difference DIF. Note that a pixel having a greater difference DIF is more likely to indicate an image of a mobile body.

The exposure ratio D is an exposure ratio NEXPT/AEXPT of a normal exposure time NEXPT by the normal exposure to an additional exposure time AEXPT by the additional exposure. In FIG. 10, the exposure ratio D (NEXPT/AEXPT) is "1". By using the exposure ratio D, the difference DIF can be calculated by assigning the same weight to the additional exposure time AEXPT and the normal exposure time NEXPT.

For example, in the case where the additional exposure time AEXPT per frame is equal to the normal exposure time NEXPT per frame, the weight of the additional exposure time AEXPT is the same as that of the normal exposure time NEXPT because of the exposure ratio D="1". In the case where the additional exposure time AEXPT per frame is twice the normal exposure time NEXPT per frame, the weight of the additional exposure time AEXPT is set to one half of that of the normal exposure time NEXPT because of the exposure ratio D="0.5".

The total value calculation unit 42 calculates the sum of the pixel values F[n] and F[n+1] as a total value M. The synthesis gain calculation unit 43 calculates a ratio NEXPT/(NEXPT+AEXPT) of the normal exposure time NEXPT to the sum of the normal exposure time NEXPT and the additional exposure time AEXPT, as a synthesis gain K. In FIG. 10, the synthesis gain K is "0.5".

For example, in the case where the additional exposure time AEXPT per frame is equal to the normal exposure time NEXPT per frame, the pixel value (brightness) is doubled by adding the pixel values F[n] and F[n+1]. In this case, the synthesis gain K is set to "0.5", and the pixel value F[n2] to be increased by addition is converted to a pixel value without addition.

In the case where the additional exposure time AEXPT per frame is three times the normal exposure time NEXPT per frame, the pixel value (brightness) is quadrupled by adding the pixel values F[n] and F[n+1]. In this case, the synthesis gain K is set to "0.25", and the pixel value F[n2] to be increased by addition is converted to a pixel value without addition.

The blend ratio calculation unit 44 calculates a blend ratio $\alpha$ of pixel values F[n] and F[n+1], based on the difference DIF and the total value M using formula (1).

$$\alpha = 2 - DIFr * Mr \quad (1)$$

In formula (1), the ratio DIFr is "0" if the difference DIF is less than or equal to a threshold VT1, or "1" if the difference DIF is greater than or equal to a threshold VT2. The ratio DIFr gradually increases from "0" to "1" if the difference DIF is between the threshold VT1 and the threshold VT2. In formula (1), the ratio Mr is "0" if the total value M is less than or equal to a threshold VT3, or "1" if the total value M is greater than or equal to a threshold VT4. The ratio Mr gradually increases from "0" to "1" if the total value M is between the threshold VT3 and the threshold VT4.

Accordingly, the blend ratio $\alpha$ is "2" if the difference DIF is less than or equal to the threshold VT1 or the total value M is less than or equal to the threshold VT3. The blend ratio $\alpha$ is "1" if the difference DIF is greater than or equal to the threshold VT2 and the total value M is greater than or equal to the threshold VT4. If the difference DIF and the total value M take other values, the blend ratio $\alpha$ is greater than "1" and less than "2".

The blend processing unit 45 blends, for example, the normal pixel value F[n] and the additional pixel value F[n+1] for each pixel using formula (2), to generate a pixel value F[n2]. In formula (2), an operator * denotes the multiplication operator.

$$F[n2] = F[n] * \alpha * K + F[n+1] * (2-\alpha) * K \quad (2)$$

From formula (2), a greater blend ratio $\alpha$ makes the ratio of the normal pixel value F[n] to the blended pixel value F[n2] relatively greater. A smaller blend ratio $\alpha$ makes the ratio of the normal pixel value F[n] to the blended pixel value F[n2] relatively smaller.

FIG. 14 illustrates an example of operations of the image synthesis unit 197B in FIG. 13. In operations illustrated in FIG. 14, the image data IMG illustrated in FIG. 5 is used. Images illustrated under F[n] are images generated when normal pixel values F[n] are used. An image illustrated under F[n] is also referred to as a normal image.

Images illustrated under F[n+1] are images generated when additional pixel values F[n+1] are used. An image illustrated under F[n+1] is also referred to as an additional image. Images illustrated under F[n]+F[n+1] are images generated when the normal pixel values F[n] is added with the additional pixel values F[n+1]. An image illustrated under F[n]+F[n+1] is also referred to as a synthesized image.

An image of a traffic signal may have a red light in either a normal image or an additional image in a turned-off state due to an occurrence of a flicker. In the synthesized image, the red light is in a turned-on state. Therefore, it is favorable that for an image captured under a condition in which a flicker is likely to occur, a synthesized image indicated by an asterisk is used. In addition, in the image of the traffic signal, the pixel value of the total value M and the pixel value of the difference value DIF both become greater in the area of the red light, and both become smaller in the area other than the red light.

Therefore, it can be seen that a flicker is likely to occur when both the pixel value of the total value M and the pixel value of the difference value DIF are great. Therefore, the blend ratio calculation unit 44 in FIG. 13 determines a pixel area in which the difference DIF is greater than or equal to the threshold VT2 and the total value M is greater than or equal to the threshold VT4, as a flicker area in which a flicker occurs. From the above, the ideal blend ratio $\alpha$ is "1.0".

In some cases, although an image of a vehicle (a moving object) is normal in a normal image and in an additional image, a blur (afterimage) occurs in a synthesized image due to movement of the vehicle. Therefore, it is favorable that, for example, for an image of a moving object, a normal image indicated by an asterisk is used. In addition, in the image of a moving object, the pixel value of the total value M is small in all areas. The pixel value of the difference value DIF is greater in the area of the vehicle and smaller in the area other than the vehicle. Therefore, it can be seen that a blur of an image of a moving object is likely to occur when the pixel value of the total value M is small and the pixel value of the difference value DIF is great. Therefore, the blend ratio calculation unit 44 determines a pixel area in which the difference DIF is greater than or equal to the threshold VT2 and the total value M is less than or equal to the threshold VT3, as a moving object area including a moving object. From the above, the ideal blend ratio α is "2.0".

An image of a stationary object is normal in all of the normal image, additional image, and synthesized image. In addition, in an image of a stationary object, the pixel value of the total value M is small in all areas, and the pixel value of the difference value DIF is small in all areas. Therefore, any of the normal image, additional image, and synthesized image may be used for the stationary object. Here, for an image of a stationary object, it is favorable to use the normal image indicated by an asterisk. In addition, although the ideal blend ratio α of the image of the stationary object is set to 2.0, any blend ratio α may be adopted. Therefore, the blend ratio calculation unit 44 determines a pixel area in which the difference DIF is less than or equal to the threshold VT1 and the total value M is less than or equal to the threshold VT3, as a stationary area including a stationary object.

By synthesizing the normal pixel value F[n] and the additional pixel value F[n+1] to generate the pixel value F[n2] by the image synthesis unit 197B illustrated in FIG. 13, image data in which a flicker is suppressed and a blur of a moving object is suppressed can be generated. In this case, image data in which a flicker is suppressed and a blur of a moving object is suppressed can be generated without using a flicker detection unit and a moving object detection unit. Generation of the pixel value F[n2] is executed by units of pixels; therefore, as illustrated in FIG. 5, in the case where image data obtained on one line that includes a traffic signal, a moving object, and a stationary object, synthesis processing suitable for each image can be executed.

For example, a flicker is likely to occur in a pixel having a great difference DIF and a great total value M; therefore, the image synthesis unit 197B sets the blend ratio α to "1.0", and blends the normal pixel value F[n] with the additional pixel value F[n+1]. A moving object is likely to be captured in a pixel having a great difference DIF and a total value M being normal or less; therefore, the image synthesis unit 197B sets the blend ratio α to "2.0", and outputs the normal pixel value F[n] as the blended pixel value F[n2]. A stationary object (normal subject) is likely to be captured in a pixel having a small difference DIF and a total value M being normal or less; therefore, in this case, the image synthesis unit 197B may set the blend ratio α to either "1.0" or "2.0". However, it is favorable that the blend ratio α is set to "2.0" in order to reduce the calculation amount in the blend processing unit 45 and to reduce the calculation error.

Note that the image synthesis unit 197B executes synthesis processing by units of pixels, and thereby, can process an image in which a flicker occurs and an image in which a blur occurs, locally. In other words, degradation of image quality that would happen due to the influence of synthesis processing can be suppressed in an image area in which a flicker does not occur and in an image area in which a blur does not occur.

Note that in FIG. 12 and FIG. 13, although an example has been described in which the image synthesis unit 197B is provided in the imaging device 19B, the image synthesis unit 197B may be provided in the image processing device 10. In this case, the imaging device 19B outputs each of the normal pixel value F[n] and the additional pixel value F[n+1] to the image processing device 10 as image data.

As above, also in this embodiment, substantially the same effects as in the embodiments described above can be obtained. Further, in this embodiment, the pixel value F[n2] can be generated by synthesizing the normal pixel value F[n] and the additional pixel value F[n+1] by units of pixels. Accordingly, as illustrated in FIG. 5, also in the case where the image data obtained in one line that includes a traffic signal, a moving object, and a stationary object, synthesis processing suitable for each image can be executed.

In addition, by synthesizing the normal pixel value F[n] and the additional pixel value F[n+1] to generate the pixel value F[n2] by the image synthesis unit 197B illustrated in FIG. 13, image data in which a flicker is suppressed and a blur of a moving object is suppressed can be generated. In this case, image data in which a flicker is suppressed and a blur of a moving object is suppressed can be generated without using a flicker detection unit and a moving object detection unit.

Fourth Embodiment

Figure 15:
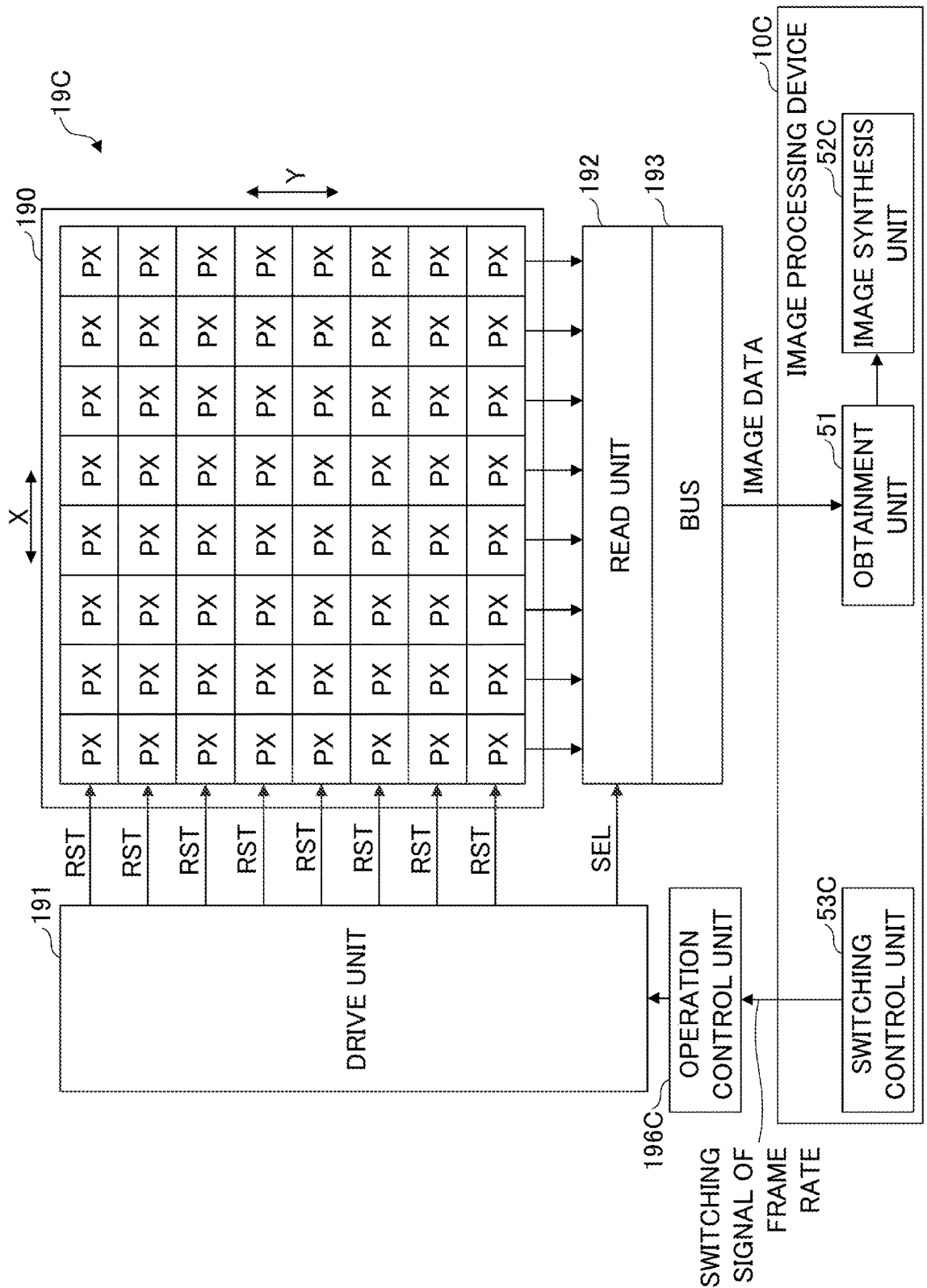
FIG. 15 is a block diagram illustrating an example of a configuration of an imaging device included in an image processing system according to a fourth embodiment.

FIG. 15 illustrates an example of a configuration of an imaging device included in an image processing system according to a fourth embodiment. Elements that are substantially the same as those in the embodiments described above are assigned the same reference numerals, and detailed description will be omitted. In the image processing system 100, elements except for the imaging device 19C are substantially the same as in FIGS. 1, 2, and 4 except that an image processing device 10C is provided in place of the image processing device 10. For example, among the imaging devices 19a to 19e in FIG. 1, at least the imaging device 19e is replaced with an imaging device 19C illustrated in FIG. 15.

The imaging device 19C includes an operation control unit 196C in place of the operation control unit 196B in FIG. 12. In addition, the imaging device 19C does not include the image synthesis unit 197B in FIG. 12. The other elements of the imaging device 19A are substantially the same as those of the imaging device 19 in FIG. 3 and the imaging device 19B in FIG. 12. In other words, the imaging device 19C includes a function of obtaining an image by a rolling shutter method.

The image processing device 10C includes an obtainment unit 51, an image synthesis unit 52C, and a switching control unit 53C. The obtainment unit 51 obtains image data output from the imaging device 19C for each frame. The image synthesis unit 52C executes synthesis processing of image data using the image data obtained by the obtainment unit 51. The switching control unit 53C outputs a switching signal to switch the frame rate of the imaging device 19C to the imaging device 19C.

The operation control unit 196C controls the drive unit 191 and the read unit 192 to obtain image data frame by frame. In addition, the operation control unit 196C switches the frame rate of the imaging device 19C in response to the switching signal from the switching control unit 53C.

Figure 16:
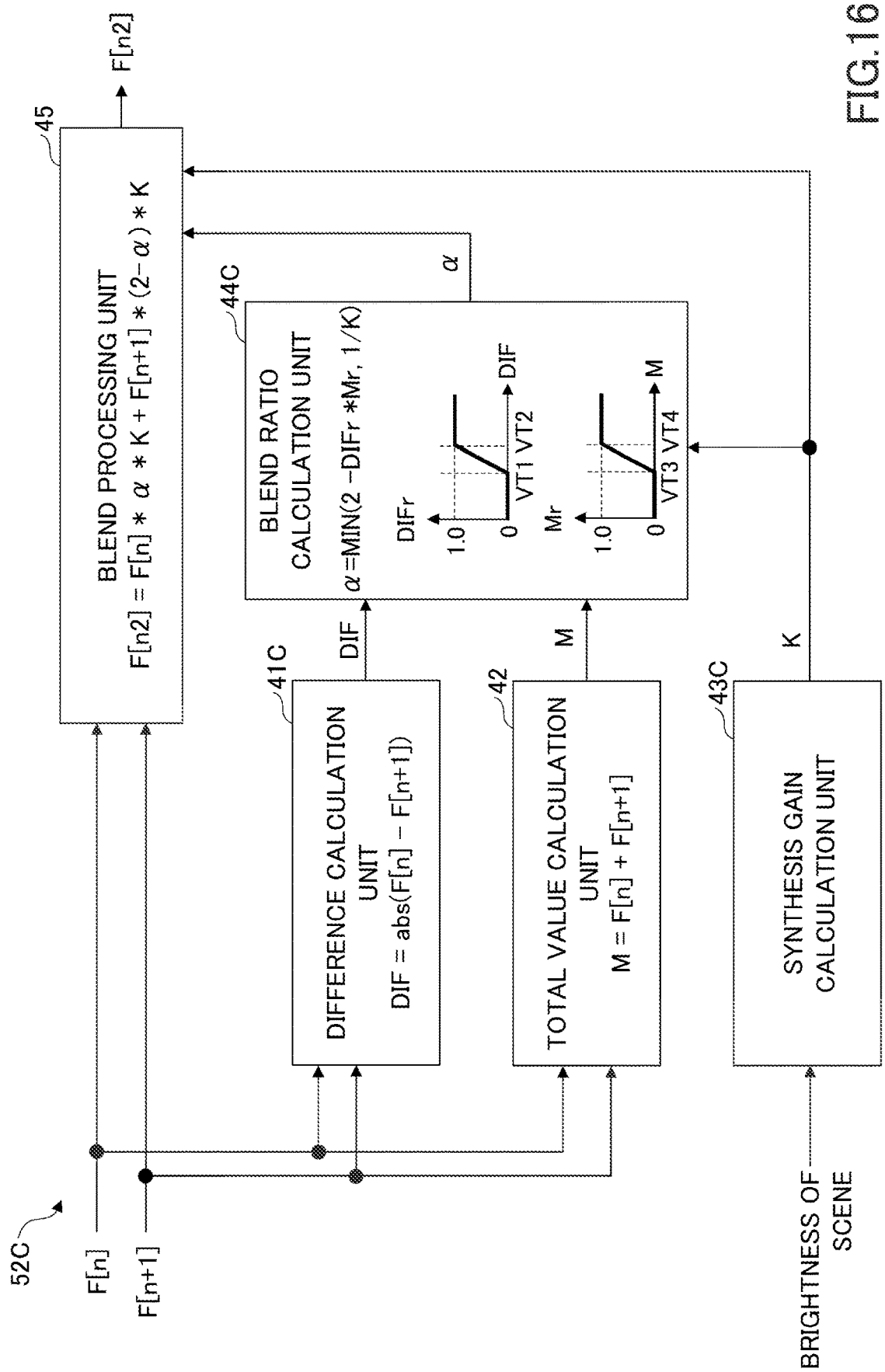
FIG. 16 is a block diagram illustrating an example of an image synthesis unit in FIG. 15.

FIG. 16 illustrates an example of the image synthesis unit 52C in FIG. 15. Elements that are substantially the same as those in FIG. 13 are assigned the same reference numerals, and detailed description will be omitted.

The image synthesis unit 52C includes a difference calculation unit 41C, a total value calculation unit 42, a synthesis gain calculation unit 43C, a blend ratio calculation unit 44C, and a blend processing unit 45. The configurations and functions of the total value calculation unit 42 and the blend processing unit 45 are substantially the same as those of the total value calculation unit 42 and the blend processing unit 45 in FIG. 13. The image synthesis unit 52C includes multiple instances of the configuration illustrated in FIG. 16, and executes synthesis processing of pixel values of multiple pixels in parallel. The difference calculation unit 41C, the total value calculation unit 42, and the blend ratio calculation unit 44C constitute an example of a flicker detection unit that detects a flicker area in which a flicker occurs, based on image data of multiple frames.

The difference calculation unit 41C calculates an absolute value (abs) of difference between the pixel values F[n] and F[n+1] as a difference DIF. The synthesis gain calculation unit 43C calculates a synthesis gain K in accordance with the brightness of a subject area captured by the imaging device 19C. The method of calculating the synthesis gain K will be described with FIG. 17. For example, the brightness of a scene may be measured by an illuminometer installed in the mobile body 200 or the imaging device 19C.

The blend ratio calculation unit 44C calculates a blend ratio α of the pixel values of frames F[n] and F[n+1], based on the difference DIF and the total value M using formula (3). The ratio DIFr and the ratio Mr can be determined as in FIG. 13. A symbol MIN is an operation to select the smaller of "2−DIFr*Mr" and "1/K". In formula (3), a condition is added to formula (1) to clip the blend ratio α so as not to be greater than "1/K". In other words, the minimum value of the blend ratio α is clipped at "1/K".

$$\alpha=MIN(2-DIFr*Mr,1/K) \quad (3)$$

Using the blend ratio α calculated by the blend ratio calculation unit 44C, the blend processing unit 45 blends pixel values of, for example, odd-numbered frames F[n] and even-numbered frames F[n+1] adjacent to each other for each pixel using the above formula (2). Further, the blend processing unit 45 generates pixel values F[n2].

Figure 17:
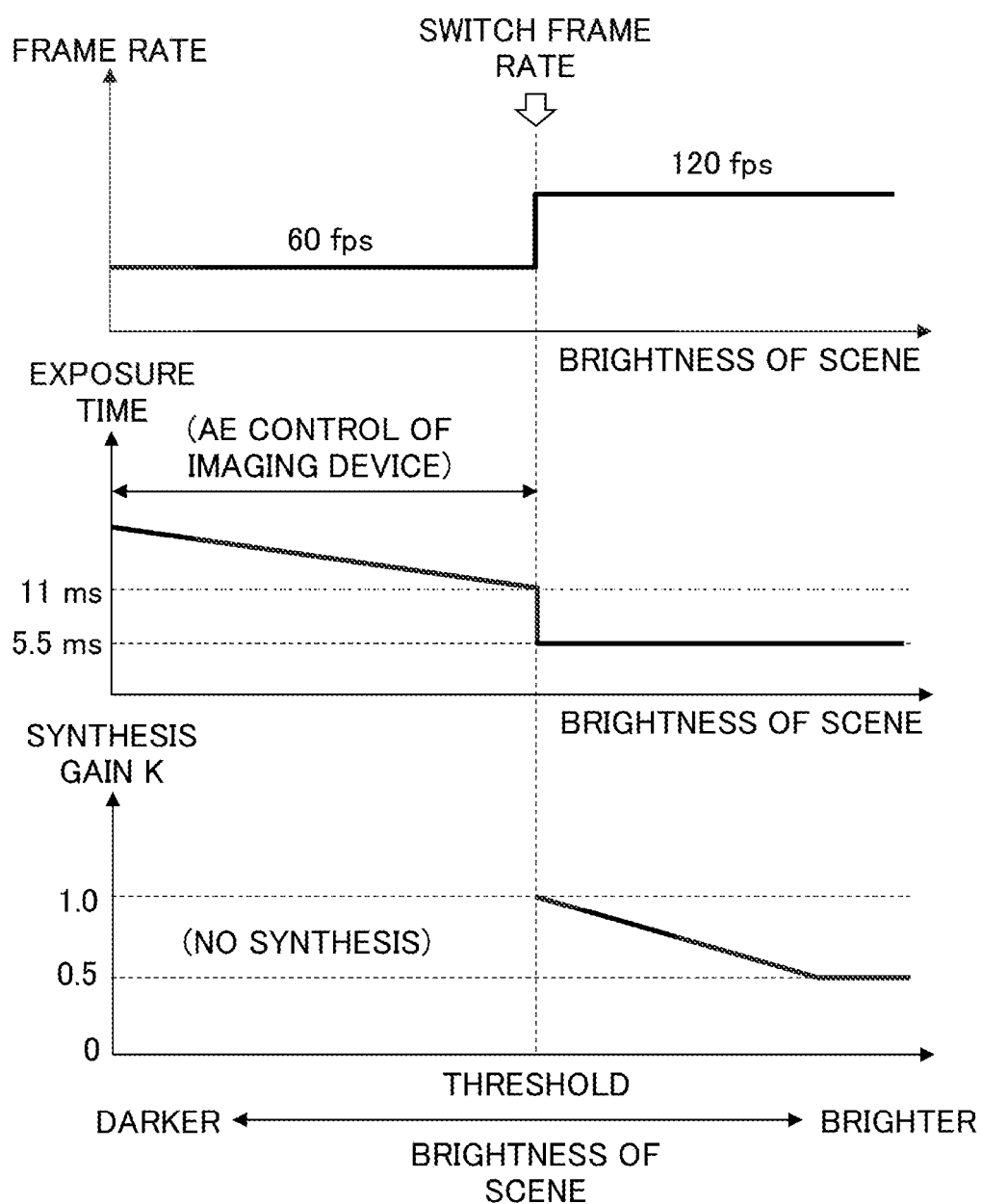
FIG. 17 is an explanatory diagram illustrating a relationship among the synthesis gain K calculated by a synthesis gain calculation unit in FIG. 16, the brightness of a scene, and the frame rate.

FIG. 17 illustrates a relationship among the synthesis gain K calculated by the synthesis gain calculation unit 43C in FIG. 16, the brightness of a scene, and the frame rate. In the case where the brightness of a scene measured by an illuminometer or the like is brighter than a threshold, the image processing device 10C outputs a switching signal to the imaging device 19C to switch the frame rate from 60 fps (frames per second) to 120 fps. The imaging device 19C switches the frame rate from 60 fps to 120 fps based on the switching signal.

For example, in the case where the frame rate is 60 fps (a period of approximately 16.7 ms), the imaging device 19C sets the exposure time to be greater than or equal to 11 ms in accordance with the brightness of the scene. For example, the imaging device 19C determines the exposure time using a built-in auto exposure (AE) function. In addition, the imaging device 19C fixes the exposure time at 5.5 ms in the case where the frame rate is 120 fps (a period of approximately 8.3 ms).

Note that the minimum value of the exposure time when the frame rate is 60 fps and the exposure time when the frame rate is 120 fps are not limited to 11 ms and 5.5 ms. It is sufficient for the minimum value of the exposure time when the frame rate is 60 fps to be twice the exposure time when the frame rate is 120 fps, as long as a flicker can be suppressed.

Note that in an image captured with an exposure time of 11 ms, although an occurrence of a flicker of an LED light source or the like can be suppressed, a blur of a moving object (afterimage) may occur. On the other hand, in an image captured with an exposure time of 5.5 ms, although a flicker of an LED light source or the like may occur, a blur of a moving object (afterimage) can be reduced.

The synthesis gain calculation unit 43C does not calculate the synthesis gain K during a period of the frame rate being 60 fps, and for example, outputs "1" indicating that no gain processing is executed. In this case, the other elements of the image synthesis unit 52C in FIG. 16 also stop operating. Further, the respective pixel values of frames F[n] and F[n+1] of an image captured with an exposure time of greater than or equal to 11 ms are output as pixel values F[n2].

The synthesis gain calculation unit 43C gradually lowers the synthesis gain K from "1.0" to "0.5" as the scene becomes brighter during a period of the frame rate being 120 fps to suppress saturation of the pixel value. Note that by setting the synthesis gain K when switching the frame rate to "1.0", change in brightness due to switching of the exposure time can be suppressed when an image captured with the exposure time of 5.5 ms is synthesized by the blend processing unit 45.

For example, in the case where the brightness of a scene is slightly exceeds the threshold and the frame rate is switched from 60 fps to 120 fps, the synthesis gain K is approximately "1", as illustrated in FIG. 17. At this time, assume that the ratio DIFr is great and the ratio Mr is small in a moving object area in the image. In this case, in the blend ratio calculation unit 44 in FIG. 13, although the blend ratio α is set to "2", the blend ratio calculation unit 44C of this embodiment sets the blend ratio α to "1" because "1/K" is clipped to "1".

Based on the blend ratio α="1", the blend processing unit 45 outputs a pixel value F[n2] that is obtained by adding the pixel value in each pixel of the moving object area of frames F[n] and F[n+1]. The total of the exposure times for frames F[n] and F[n+1] at a frame rate of 120 fps is 11 ms, which is the same as at a frame rate of 60 fps. Therefore, afterimages of an image of the moving object area before and after switching the frame rate are comparable, and hence, the operation control unit 196C can output an image (F[n2]) in which discomfort that would be felt by a viewer is alleviated.

In contrast, in the case where there is no clip by "1/K" under the same conditions, the blend ratio α is approximately "2"; therefore, the blend processing unit 45 doubles the pixel value of each pixel in the moving object area of the frame F[n], and outputs it as the pixel value F[n2]. The exposure time of the frame F[n] is 5.5 ms, which is half the exposure time of the frame F[n] (11 ms) before switching the frame rate. Therefore, after the frame rate is switched, the afterimage of the image in the moving object area suddenly decreases, and an image (F[n2]) with which discomfort is felt may be output.

Note that if the brightness of a scene is sufficiently greater than the threshold, "1/K" will be approximately "2". Therefore, the blend ratio α calculated by the blend ratio calculation unit 44C varies appropriately between "1.0" and "2.0" depending on the characteristics of the image, based on "2-DIFr*Mr" in formula (2). The synthesis gain K gradually changes as the scene becomes brighter; therefore, discomfort caused by a sudden change in the synthesis gain K can be suppressed.

Figure 18:
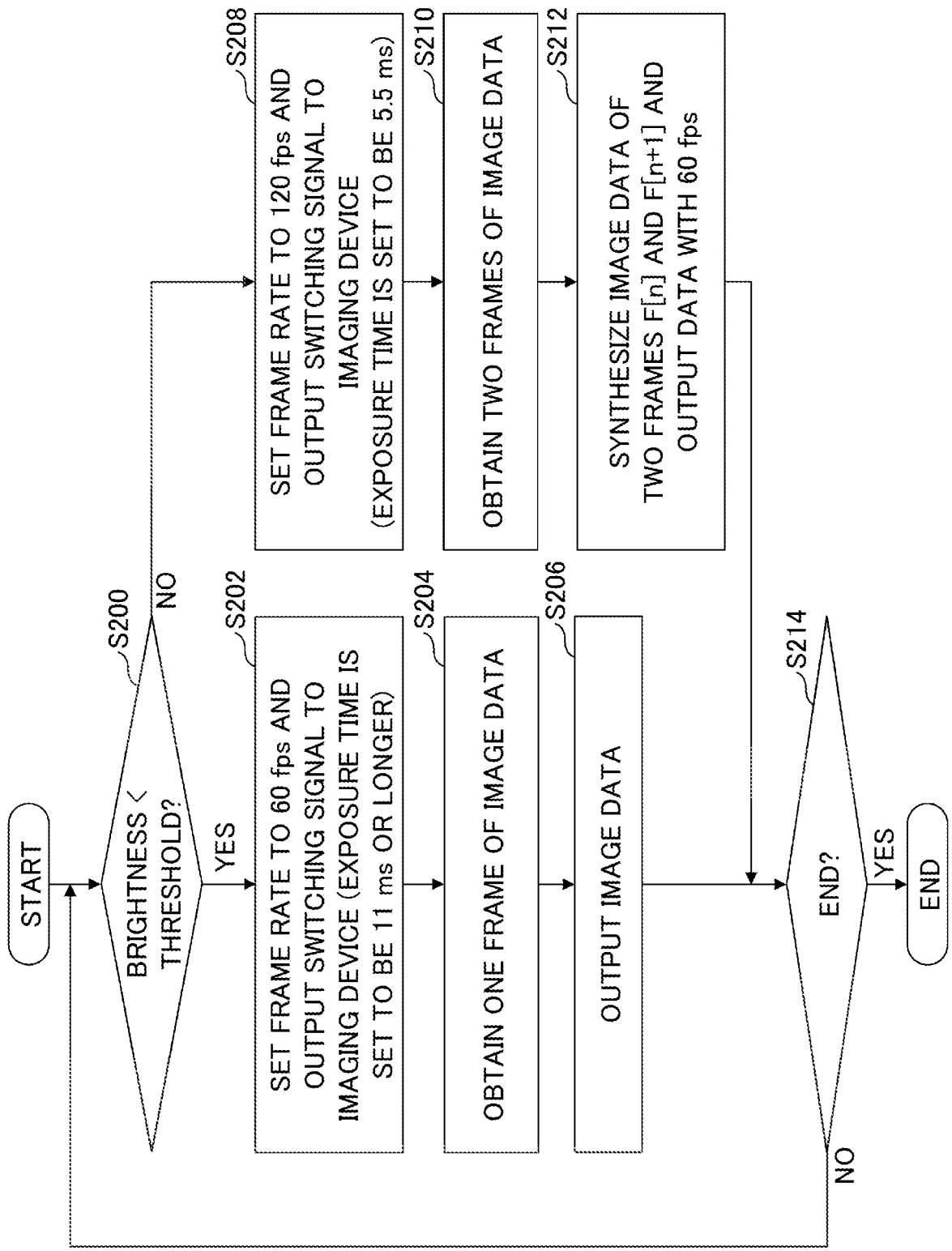
FIG. 18 is a flow chart illustrating an example of operations of the image processing device in FIG. 16.

FIG. 18 illustrates an example of operations of the image processing device 10C in FIG. 16. In other words, FIG. 18 illustrates an example of an image processing method of the image processing device 10C. For example, the operations illustrated in FIG. 18 may be implemented by an image processing program executed by the CPU 20 (FIG. 4) installed in the image processing device 10C or by hardware installed in the image processing device 10C. The operations illustrated in FIG. 18 are initiated based on, for example, activation of the image processing device 10C upon power-up.

First, at Step S200, the image processing device 10C determines whether the brightness of a scene in a subject area captured by the imaging device 19C is less than the threshold. The image processing device 10C executes Step S202 if the brightness is less than the threshold, or executes Step S208 if the brightness is greater than the threshold.

At Step S202, the image processing device 10C outputs a switching signal to the imaging device 19C, to set the frame rate to 60 fps. Based on the switching signal, the imaging device 19C sets the exposure time of one frame to be greater than or equal to 11 ms in accordance with the brightness of the scene. Next, at Step S204, the image processing device 10C obtains one frame of image data from the imaging device 19C. Next, at Step S206, the image processing device 10C outputs the one frame of image data generated at Step S204 to the display device 12 or the like, and then, executes Step S214.

On the other hand, at Step S208, the image processing device 10C outputs a switching signal to the imaging device 19C, to set the frame rate to 120 fps. Based on the switching signal, the imaging device 19C sets the exposure time of one frame to 5.5 ms regardless of the brightness of the scene. Next, at Step S210, the image processing device 10C obtains image data of two consecutive frames F[n] and F[n+1] from the imaging device 19C. Next, at Step S212, the image processing device 10C synthesizes image data of consecutive two frames F[n] and F[n+1] obtained from the imaging device 19C, and outputs the frame to the display device 12 or the like at 60 fps. After Step S212, Step S214 is executed.

At Step S214, the image processing device 10C determines whether to end the image data obtainment processing and the image data output processing. If ending the image data obtainment processing and the image data output processing, the operation control unit 196 ends the operation illustrated in FIG. 18. If continuing the image data obtainment processing and the image data output processing, the operation control unit 196 executes the operation at Step S200.

FIG. 19 illustrates an example of operations of the image synthesis unit 52C in FIG. 16. Detailed description will be omitted for elements that are substantially the same as in FIG. 14. In the operations illustrated in FIG. 19, the image data illustrated in FIG. is used. In FIG. 19, an image illustrated under F[n] is also referred to as a pre-image. An image illustrated under F[n+1] is also referred to as a post-image. An image illustrated under F[n]+F[n+1] is also referred to as a synthesized image.

The states of the pre-image F[n], the post-image F[n+1], and the synthesized image F[n]+F[n+1] are substantially the same as those of the normal image F[n], the additional image F[n+1], and the synthesized image F[n]+F[n+1] illustrated in FIG. 14, respectively, except that the images are of different frames. Therefore, the features of the total value M, the features of the differential DIF, and the images favorable to be used that are indicated by asterisks, are substantially the same as in FIG. 14.

However, in this embodiment, it is favorable that, in an image area where the difference DIF is great and the total value M is small in a pre-image F[n] and a post-image F[n+1] (moving object), the blend ratio α is set to "1/K". In addition, it is favorable that, in an image area where the difference DIF and the total value M are both small in a pre-image F[n] and a post-image F[n+1] (stationary object), the blend ratio α is set to "1/K".

Note that the image synthesis unit 52C illustrated in FIG. 16 may be provided in the imaging device 19C. In this case, synthesis of images illustrated in FIG. 17 and FIG. 18 is executed by the imaging device 19C, and the synthesized image is output from the imaging device 19C to the image processing device 10C or the like.

As above, also in this embodiment, substantially the same effects as in the embodiments described above can be obtained. Further, in this embodiment, the image synthesis unit 52C provided in the image processing device 10C is used to execute synthesis processing of images in a frame. Accordingly, as illustrated in FIG. 5, also in the case where the image data obtained in one line that includes a traffic signal, a moving object, and a stationary object, synthesis processing suitable for each image can be executed.

In addition, by gradually lowering the synthesis gain K from 1.0 to 0.5 as the scene becomes brighter during a period of the frame rate being 120 fps, saturation of pixel values can be suppressed also in the case of synthesizing two frames with the frame rate of 120 fps. In the case where the scene is not bright, by setting the frame rate to 60 fps, generation of noise can be reduced. Further, the imaging device 19C does not have an image synthesis unit; therefore, a flicker can be suppressed for each pixel of an image, and a blur of a moving object can be suppressed using the normal imaging device 19C.

Fifth Embodiment

Figure 20:
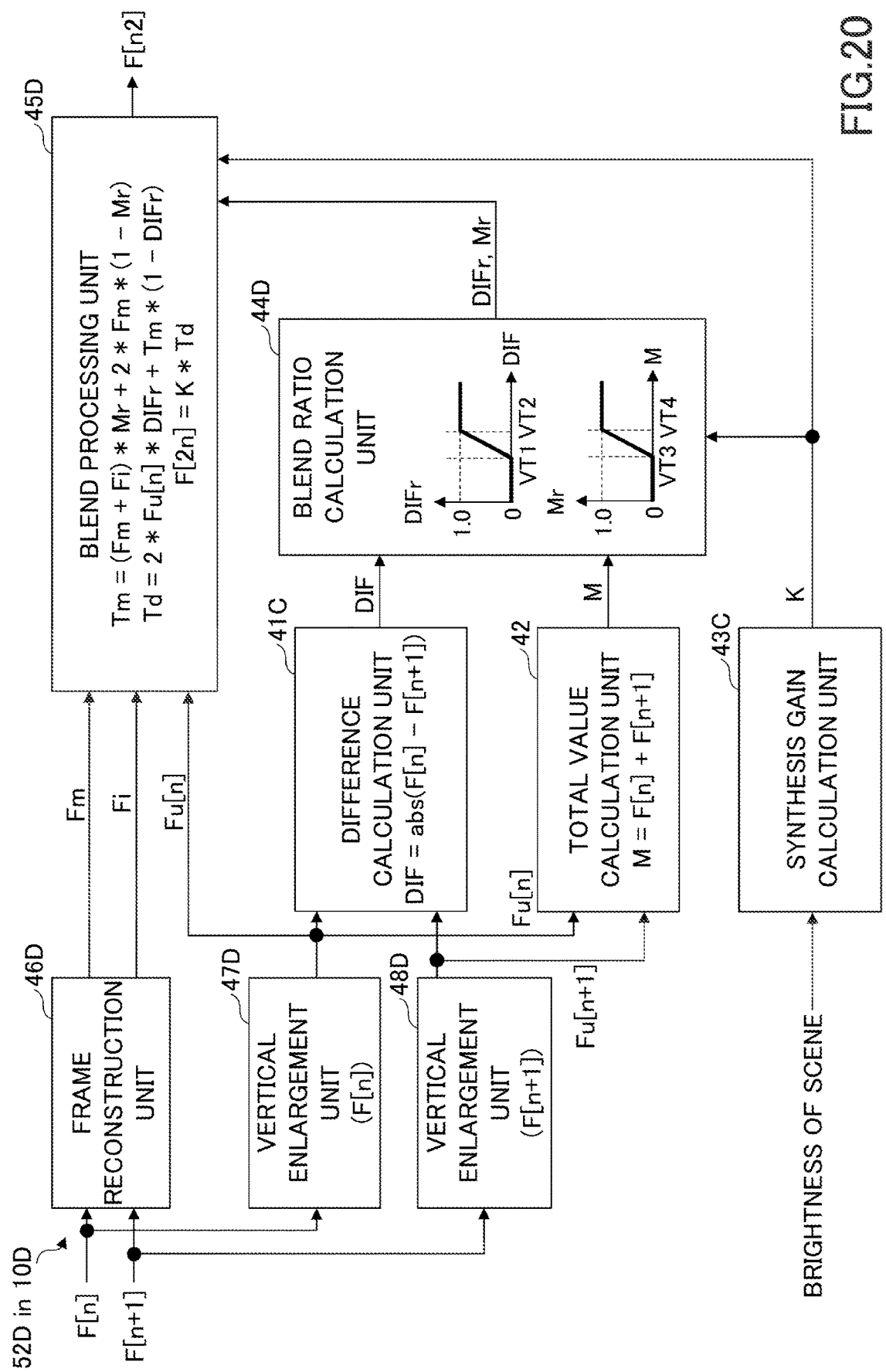
FIG. 20 is a block diagram illustrating an example of an image synthesis unit included in an image processing system according to a fifth embodiment.

FIG. 20 illustrates an example of an image synthesis unit 52D included in an image processing system according to a fifth embodiment. Elements that are substantially the same as those in the embodiments described above are assigned the same reference numerals, and detailed description will be omitted. The image synthesis unit 52D is included in an image processing device 10D installed in the image processing system 100 in place of the image processing device 10 in FIG. 2. The image processing device 10D has the same configuration and functions as the image processing device 10C except that it includes the image synthesis unit 52D in place of the image synthesis unit 52C of the image processing device 10C in FIG. 15.

The image processing system 100 is substantially the same as in FIGS. 1, 2, and 4 except that the image processing device 10D is provided in place of the image processing device 10. In addition, among the imaging devices 19a to 19e installed in the mobile body 200 illustrated in FIG. 1, at least the imaging device 19e is replaced with an imaging device 19D (not illustrated).

In the case where the frame rate is set to 120 fps, for example, the imaging device 19D outputs image data of odd-numbered lines in an odd-numbered frame F[n] and image data of even-numbered lines in an even-numbered frame F[n+1]. The other elements and functions of the imaging device 19D are substantially the same as those of the imaging device 19C illustrated in FIG. 15.

Figure 21:
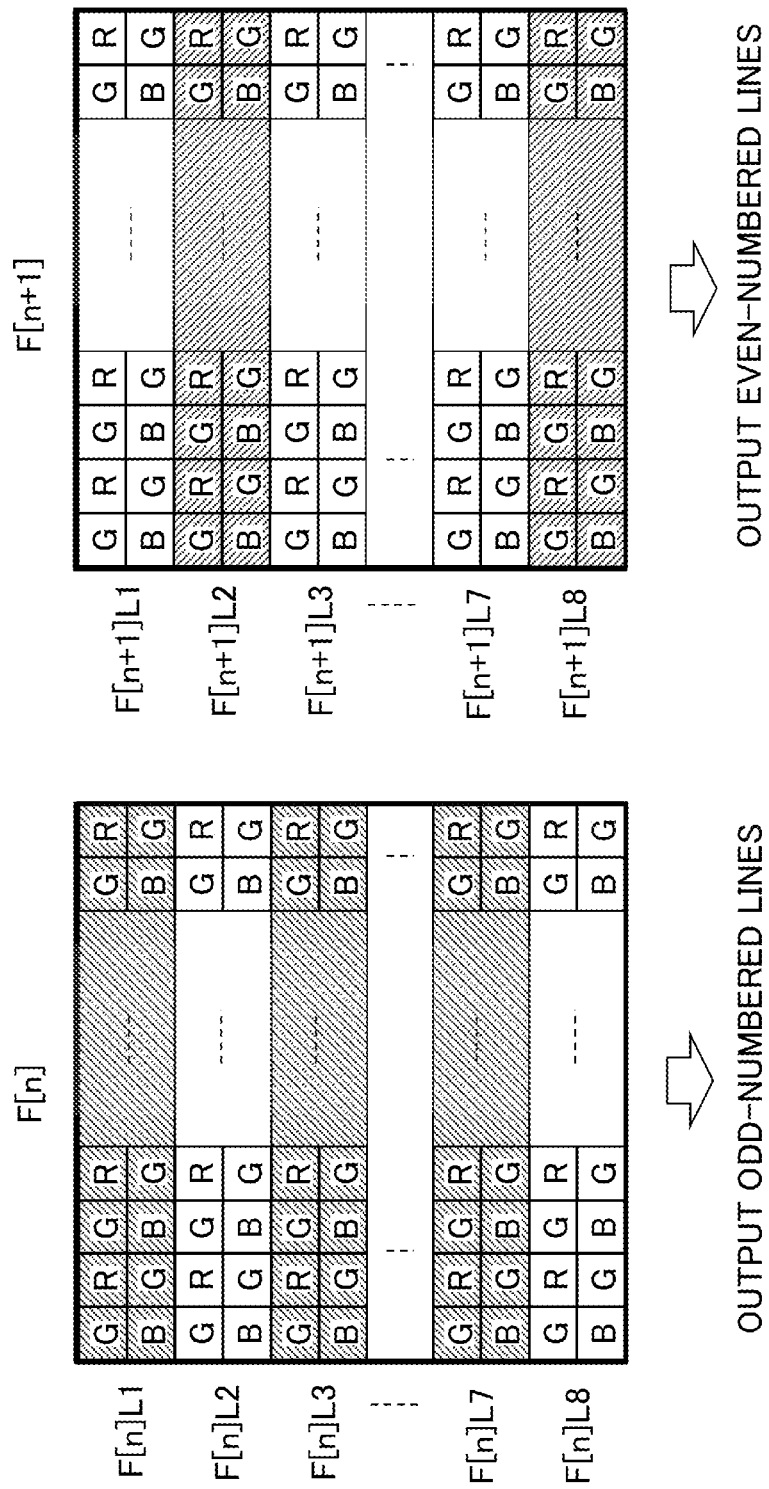
FIG. 21 is an explanatory diagram illustrating an example of image data of odd-numbered frames and even-numbered frames output by an imaging device in the case where the frame rate is set to 120 fps.

Note that in the case where the frame rate is set to 120 fps, the imaging device 19D may output, for example, image data of even-numbered lines to the odd-numbered frame F[n] and image data of odd-numbered lines to the even-numbered frame F[n+1]. Examples of image data of the odd-numbered frame F[n] and the even-numbered frame F[n+1] output by the imaging device 19D in the case where the frame rate is set to 120 fps are illustrated in FIG. 21.

The image synthesis unit 52D includes a difference calculation unit 41C, a total value calculation unit 42, a synthesis gain calculation unit 43C, a blend ratio calculation unit 44D, a blend processing unit 45D, a frame reconstruction unit 46D, and vertical enlargement units 47D and 48D. In other words, the image synthesis unit 52D includes the blend ratio calculation unit 44D and the blend processing unit 45D in place of the blend ratio calculation unit 44C and the blend processing unit 45 of the image synthesis unit 52C in FIG. 16.

In addition, the image synthesis unit 52D is added with the frame reconstruction unit 46D and the vertical enlargement units 47D and 48D, as compare with the image synthesis unit 52C in FIG. 16. When the frame rate is 120 fps, the image synthesis unit 52D synthesizes image data of frames F[n] and F[n+1], that are thinned out and output from the imaging device 19D. The difference calculation unit 41C, the total value calculation unit 42, and the blend ratio calculation unit 44D constitute an example of a flicker detection unit. The blend processing unit 45D is an example of a synthesis processing unit. The vertical enlargement units 47D and 48D constitute an of an interpolated image generation unit.

Figure 22:
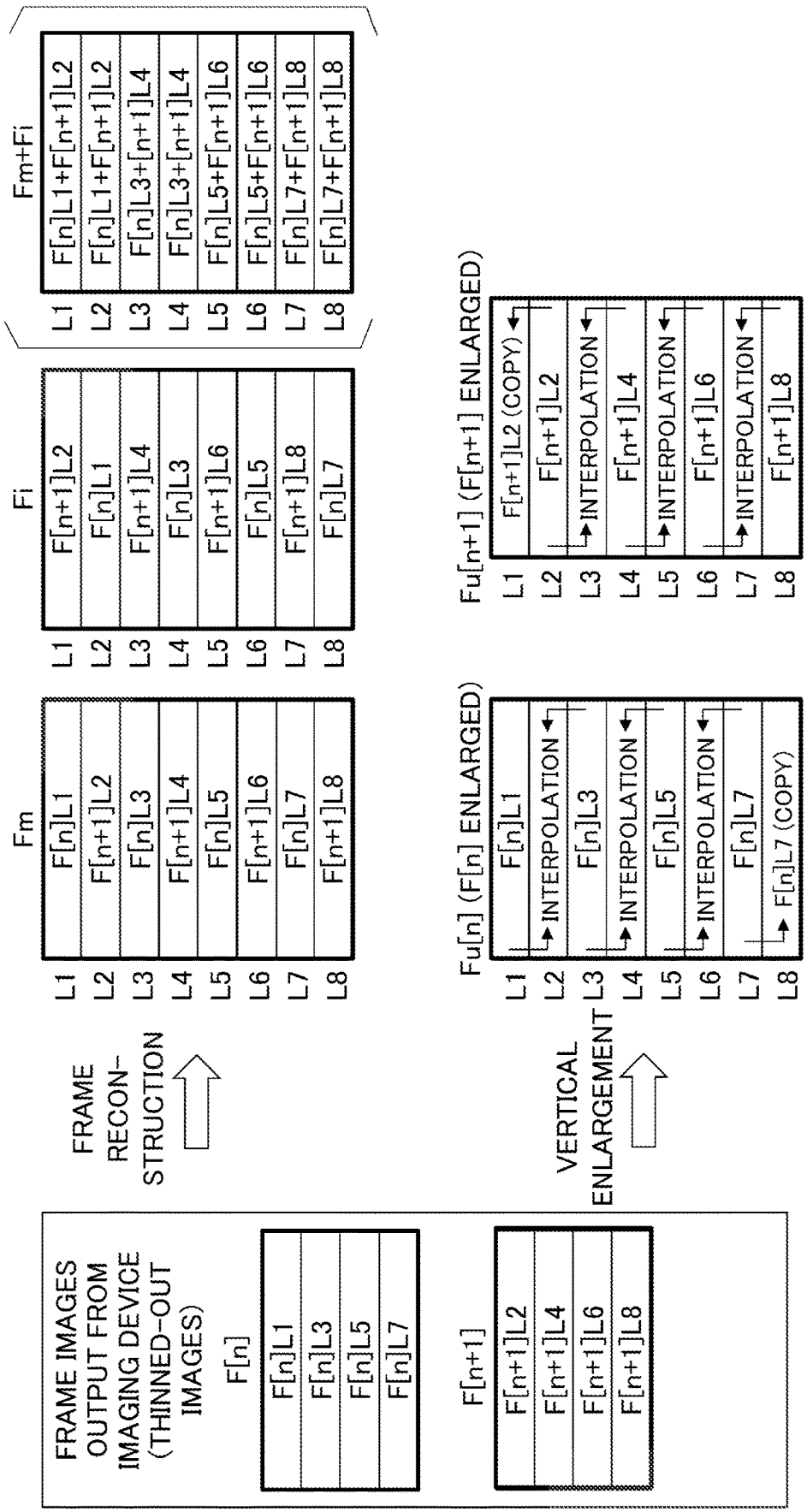
FIG. 22 is an explanatory diagram illustrating an example of image data of frames Fm and Fi generated by a frame reconstruction unit in FIG. 20, and image data of frames Fu[n] and Fu[n+1] generated by respective vertical enlargement units in FIG. 20.

The frame reconstruction unit 46D uses a frame F[n] including image data of odd-numbered lines and a frame F[n+1] including image data of even-numbered lines, to generate frames Fm and Fi, respectively, each of which includes image data of all lines. An example of image data of frames Fm and Fi generated by the frame reconstruction unit 46D is illustrated in FIG. 22. The image data of the frame Fm is an example of a first reconstructed image data, and the image data of the frame Fi is an example of a second reconstructed image data.

The vertical enlargement unit 47D increases the number of lines in the frame F[n] including the image data of odd-numbered lines, to generate a frame Fu[n] including the image data of all lines. The vertical enlargement unit 48D increases the number of the lines in the frame F[n+1] including the image data of even-numbered lines, to generate a frame Fu[n+1] including the image data of all lines. Examples of image data of frames Fu[n] and Fu[n+1] generated by the vertical enlargement units 47D and 48D, respectively, are illustrated in FIG. 22. The image data of the frame Fu[n] is an example of a first interpolated image data, and the image data of the frame Fu[n+1] is an example of a second interpolated image data.

Instead of the blend ratio α, the blend ratio calculation unit 44D outputs a ratio DIFr and a ratio Mr used for calculating the blend ratio α in FIG. 13 and FIG. 16 to the blend processing unit 45D. Using formulas (4), (5), and (6) in sequence, the blend processing unit 45D calculates the pixel value of a frame F[n2] from the pixel values of frames Fm and Fi.

$$Tm=(Fm+Fi)*Mr+2*Fm*(1-Mr) \quad (4)$$

$$Td=2*Fu[n]*DIFr+Tm*(1-DIFr) \quad (5)$$

$$F[2n]=K*Td \quad (6)$$

By using formulas (4), (5) and (6) in sequence, in a pixel area in which the ratios Mr and DIFr are close to 1, the sum of the pixel values of the frames Fm and Fi (Fm+Fi) is obtained as the pixel value of frame F[n2]; therefore, an occurrence of a flicker such as an LED light source or the like in an image can be suppressed. In a pixel area in which the ratio Mr is close to 0 and the ratio DIFr is close to 1, a pixel value twice as great as that of the frame F[n] is obtained as the pixel value of the frame F[n2]; therefore, a blur (afterimage) of a moving object or the like in an image can be suppressed. In a pixel area in which the ratios Mr and DIFr are both close to zero, the pixel value of the frame Fm is twice as great as that of the frame F[n2]; therefore, for example, the resolution of a stationary object or the like in an image can be improved. An example of operations of the image synthesis unit 52D will be described with FIG. 23.

FIG. 21 illustrates an example of image data of odd-numbered frame F[n] and even-numbered frame F[n+1] output by the imaging device 19D when the frame rate is set to 120 fps. Note that for the sake of simplicity, in the following, it is assumed that the imaging device 19D generates eight lines of image data (L1 to L8) per frame.

In the odd-numbered frame F[n], the imaging device 19D outputs image data of odd-numbered lines L1, L3, . . . , and L7 indicated by diagonal lines. In the even-numbered frame F[n+1], the imaging device 19D outputs image data of even-numbered lines L2, L4, . . . , and L8 indicated by diagonal lines. Note that in FIG. 21, an example is illustrated in which the pixel array of the imaging device 19D is a Bayer array in which a red pixel R, green pixels G, and a blue pixel B are arranged in a ratio of 1:2:1 in two vertical pixels by two horizontal pixels. However, the pixel arrangement of the imaging device 19D is not limited to the Bayer arrangement.

FIG. 22 illustrates an example of image data of frames Fm and Fi generated by the frame reconstruction unit 46D in FIG. 20, and image data of frames Fu[n] and Fu[n+1] generated by the vertical enlargement units 47D and 48D, respectively.

The image data of frame Fm is generated by alternately arranging lines L1, L3, L5, and L7 of the frame F[n] and lines L2, L4, L6 and L8 of the frame F[n+1] that are thinned-out and output from the imaging device 19D, in this order. The image data of frame Fi is generated by alternately arranging lines L2, L4, L6, and L8 of the frame F[n+1] and lines L1, L3, L5 and L7 of the frame F[n] that are thinned-out and output from the imaging device 19D, in this order.

Note that in the frame Fm+Fi that is obtained by adding the pixel values of each pixel in each line of frames Fm and Fi, image data of adjacent odd and even-numbered lines (e.g., L1 and L2) are the same.

Image data of frame Fu[n] that is obtained by vertically enlarging the thinned frame F[n] is complemented using the pixel values of adjacent odd-numbered lines to generate the pixel values of even-numbered lines between the odd-numbered lines. In addition, the image data of the last line L8 of the frame Fu[n] is generated by copying the pixel values of the line L7.

The image data of frame Fu[n+1] that is obtained by vertically enlarging the thinned frame F[n+1] is complemented using the pixel values of adjacent even-numbered lines to generate the pixel values of odd-numbered lines between even-numbered lines. In addition, the image data of the leading line L1 of the frame Fu[n+1] is generated by copying the image data of the line L2.

FIG. 23 illustrates an example of operations of the image synthesis unit 52D in FIG. 20. Detailed description will be omitted for elements that are substantially the same as in FIGS. 14 and 19. In the operations illustrated in FIG. 23, the image data illustrated in FIG. 5 is used. In FIG. 23, images illustrated under F[n] and F[n+1] are also referred to as thinned-out images. The characteristics of the total value M and the characteristics of the difference DIF are substantially the same as those in FIG. 14 and FIG. 19.

Asterisks illustrated in FIG. 23 indicate favorable synthesis methods of image data in the respective images of a traffic signal, a vehicle (moving object), and a stationary object. As described with FIG. 20, it is favorable that, in an image of a traffic signal in which the ratios Mr and DIFr are both great, the pixel value of frame Fm+Fi that is obtained by adding the image data of frames Fm and Fi for each pixel, is set as the pixel value of frame F[n2] in order to suppress an occurrence of a flicker.

It is favorable that, in an image of a vehicle (moving object) having a small ratio Mr and a great ratio DIFr, the pixel value of frame F[n] is set as the pixel value of frame F[n2] in order to suppress a blur of an image (afterimage). It is favorable that, in an image of a stationary object having both small ratios Mr and DIFr, the pixel value of frame Fm is set as the pixel value of frame F[n2] in order to improve the resolution of the image.

Figure 24:
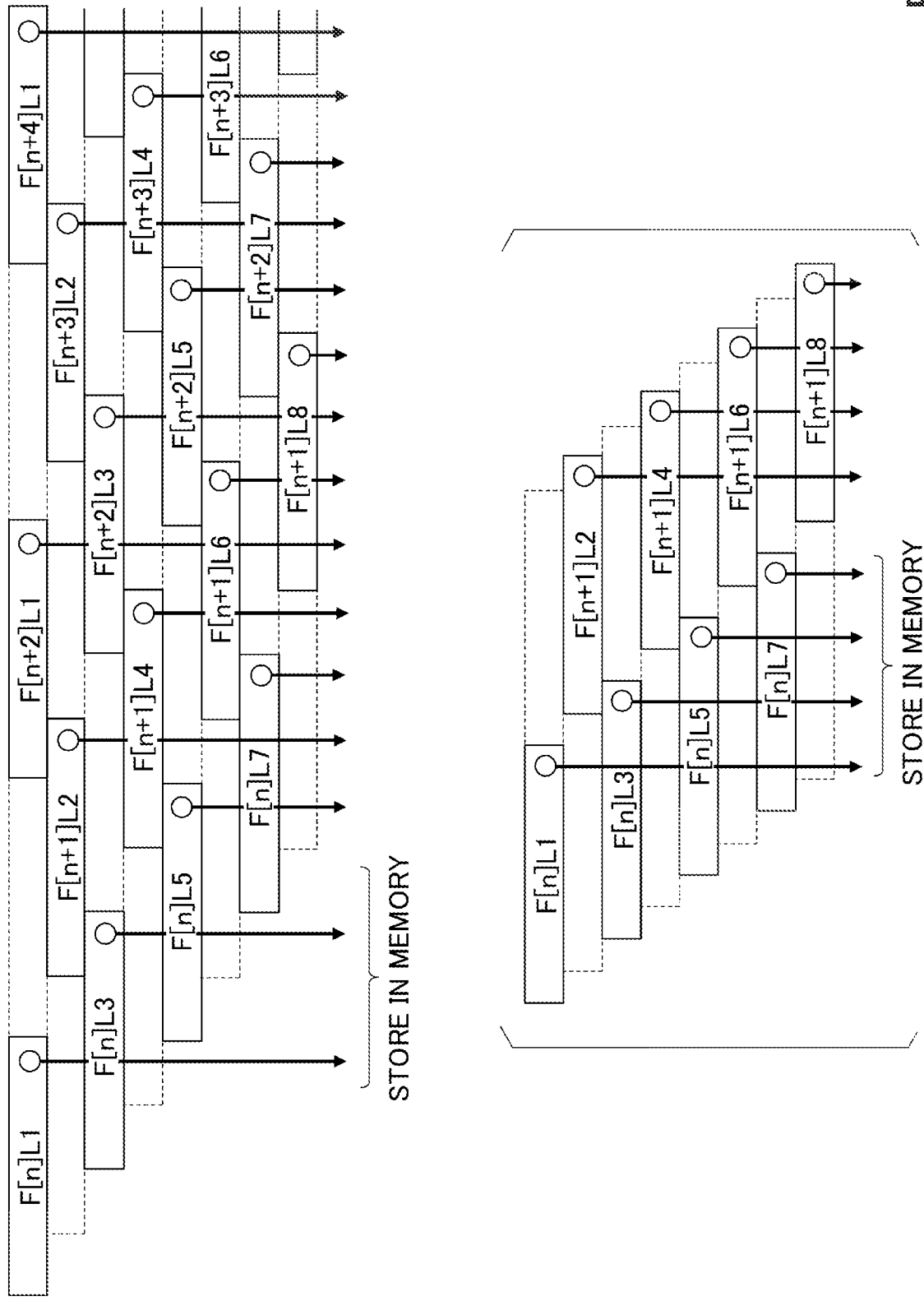
FIG. 24 is an explanatory diagram illustrating an example of outputting image data at low speed from an imaging device in the case where the frame rate is set to 120 fps.

FIG. 24 illustrates an example in which image data from the imaging device 19D in the case where the frame rate is set to 120 fps is output at low speed. In FIG. 24, lines indicated by solid-line frames indicate image data output from the imaging device 19D. Lines indicated by dashed-line frames indicate that no image data is output from the imaging device 19D.

An example of outputting image data from the imaging device 19D at normal speed is illustrated in brackets in FIG. 24. In the case of the normal speed, image data of odd lines of odd-numbered frame F[n] is stored in a memory such as a frame buffer, and then, image data of even lines of even-numbered frame F[n+1] is stored in a memory such as a frame buffer. In other words, in the case of outputting image data at the normal speed, image data of odd-numbered frame F[n] and even-numbered frame F[n+1] are synthesized using image data of odd-numbered frame F[n] stored in the memory.

In contrast, in the case of outputting image data at the low speed, it becomes possible to output image data of even-numbered frame F[n+1] from the imaging device 19D while image data of odd-numbered frame F[n] are sequentially stored in the memory. Therefore, image data can be synthesized between odd-numbered frame F[n] and even-numbered frame F[n+1] without storing all image data of odd-numbered frame F[n] in the memory. As a result, the memory usage can be reduced.

As above, also in this embodiment, substantially the same effects as in the embodiments described above can be obtained. Further, in this embodiment, image data having lines thinned out is output from the imaging device 19D to the image processing device 10D. Accordingly, while reducing the amount of image data read in the imaging device 19D and the amount of image data transferred to the image processing device 10D, image data can be generated in which a flicker is suppressed and a blur of a moving object is suppressed. In addition, the amount of image data read in the imaging device 19D can be reduced, and thereby, the power consumption of the imaging device 19D can be reduced. In other words, the power consumption of the imaging device 19D in the case where the frame rate is set to 120 fps can be made equivalent to the power consumption of the imaging device 19D in the case where the frame rate is set to 60 fps.

As above, the present inventive concept has been described based on the respective embodiments; note that the present disclosure is not limited to the requirements set forth in the embodiments described above. These requirements can be changed within a scope not to impair the gist of the present disclosure, and can be suitably defined according to applications.

What is claimed is:

1. An imaging device comprising:
   an imaging element including a plurality of photoelectric conversion elements arranged in a matrix, and configured to be driven in units of a plurality of lines each including a plurality of photoelectric conversion elements arranged in one direction;
   a memory; and
   a processor configured to execute
      detecting an occurrence of a flicker, based on image data generated by the imaging element; and
      increasing a number of times of exposures in one-frame period of the photoelectric conversion elements included in a line in which the flicker is detected by the detecting, compared with a number of times of exposures in the one-frame period of the photoelectric conversion elements included in a line in which a flicker is not detected.

2. The imaging device as claimed in claim 1,
   wherein the processor is further configured to execute generating image data from image information output from the lines every time the lines are driven,
   wherein each of the plurality of lines is driven for a plurality of times in the one-frame period, and
   wherein the generating generates, in a line in which no flicker is detected, image data using part of the image information received for the plurality of times.

3. The imaging device as claimed in claim 1, wherein the imaging element includes a drive unit configured to drive the plurality of lines, and to increase a number of times of generation of reset signals and selection signals corresponding to the line in which the flicker is detected, thereby increasing the number of times of exposures in one-frame period.

* * * * *